US012102585B2

(12) United States Patent
Kyung et al.

(10) Patent No.: US 12,102,585 B2
(45) Date of Patent: Oct. 1, 2024

(54) WEARABLE ROBOT FOR ASSISTING UPPER LIMB MOVEMENT BY USING ARTIFICIAL MUSCLE

(71) Applicants: KOREA ADVANCED INSTITUTE OF SCIENCE AND TECHNOLOGY, Daejeon (KR); National Rehabilitation Center, Seoul (KR)

(72) Inventors: Ki-Uk Kyung, Daejeon (KR); Jaeyeon Jeong, Daejeon (KR); Kyujin Hyeon, Daejeon (KR); Jungwoo Han, Daejeon (KR); Kwang-Ok An, Seoul (KR); Won-Kyung Song, Seoul (KR)

(73) Assignees: KOREA ADVANCED INSTITUTE OF SCIENCE AND TECHNOLOGY, Daejeon (KR); NATIONAL REHABILITATION CENTER, Seoul (KR)

( * ) Notice: Subject to any disclaimer, the term of this patent is extended or adjusted under 35 U.S.C. 154(b) by 792 days.

(21) Appl. No.: 17/105,692

(22) Filed: Nov. 27, 2020

(65) Prior Publication Data

US 2021/0196555 A1 Jul. 1, 2021

(30) Foreign Application Priority Data

Dec. 31, 2019 (KR) ........................ 10-2019-0179309
Mar. 19, 2020 (KR) ........................ 10-2020-0033601
Nov. 10, 2020 (KR) ........................ 10-2020-0149279

(51) Int. Cl.
*A61H 1/00* (2006.01)
*A61H 1/02* (2006.01)
*A61H 3/00* (2006.01)

(52) U.S. Cl.
CPC ............. *A61H 3/00* (2013.01); *A61H 1/0274* (2013.01); *A61H 1/0277* (2013.01);
(Continued)

(58) Field of Classification Search
CPC ................ A61H 1/0274; A61H 1/0285; A61H 2201/02; A61H 1/00; A61H 1/02;
(Continued)

(56) References Cited

U.S. PATENT DOCUMENTS 8,425,438 B2 * 4/2013 Fujimoto ................ G06F 3/014 601/40
2011/0282253 A1 * 11/2011 Menon .................... A61F 5/013 601/40
(Continued)

FOREIGN PATENT DOCUMENTS

CN 105902367 * 8/2016
JP 2006-000294 1/2006
(Continued)

OTHER PUBLICATIONS

Jaeyeon Jeong et al., "Design of SMA-based Soft Actuator and its Application for Wearable Rehabilitation Robot for Wrist Motion", The 4th International Conference on Active Materials and Soft Mechatronics (AMSM 2019) Oct. 16-19, 2019 | Sheraton Grand Incheon Hotel, Incheon, Republic of Korea.
(Continued)

*Primary Examiner* — Michael R Reid
*Assistant Examiner* — Sarah B Lederer
(74) *Attorney, Agent, or Firm* — LEX IP MEISTER, PLLC

(57) ABSTRACT

Disclosed is a wearable robot for assisting a wrist, including: a plurality of flexible actuators; and a control unit configured to control any one of the plurality of flexible actuators to be contracted or relaxed according to a wrist movement of a wearer. Each of the plurality of flexible actuators includes: a driving part which is contractively deformed by a current or transfer heat applied from the control unit or is relaxed when the heat is lost, and a refrigerant circulating part which
(Continued)

is implemented to surround the driving part and circulates a refrigerant so that the contractively deformed driving part is cooled under control of the control unit.

11 Claims, 18 Drawing Sheets

(52) U.S. Cl.
CPC ... *A61H 1/0288* (2013.01); *A61H 2001/0203* (2013.01); *A61H 2201/0207* (2013.01); *A61H 2201/0214* (2013.01); *A61H 2201/0242* (2013.01); *A61H 2201/0285* (2013.01); *A61H 2201/1207* (2013.01); *A61H 2201/1614* (2013.01); *A61H 2201/1638* (2013.01); *A61H 2201/165* (2013.01); *A61H 2201/1659* (2013.01); *A61H 2201/1671* (2013.01); *A61H 2201/1676* (2013.01); *A61H 2201/5058* (2013.01); *A61H 2201/5061* (2013.01); *A61H 2205/06* (2013.01); *A61H 2205/067* (2013.01); *A61H 2230/085* (2013.01)

(58) Field of Classification Search
CPC ......... A61H 1/0237–0288; A61F 2002/30077; B25J 9/00; B25J 9/0006; G06F 3/014
See application file for complete search history.

(56) References Cited

U.S. PATENT DOCUMENTS

2016/0107309 A1* 4/2016 Walsh ................ A63B 21/0054
248/550
2016/0206420 A1* 7/2016 Yun ........................... A61F 2/08

FOREIGN PATENT DOCUMENTS

| | | | | |
|---|---|---|---|---|
| JP | 4065459 | | | 3/2008 |
| KR | 10-1204540 | | | 11/2012 |
| KR | 10-1834970 | | | 3/2018 |
| KR | 10-1868265 | | | 6/2018 |
| KR | 101868265 | B1 | * | 6/2018 |
| KR | 10-2018-0076007 | | | 7/2018 |
| KR | 10-2018-0127201 | | | 11/2018 |
| KR | 10-2019-0044335 | | | 4/2019 |
| KR | 10-2019-0103100 | | | 9/2019 |
| KR | 20190103100 | A | * | 9/2019 |
| KR | 10-2019-0124651 | | | 11/2019 |

OTHER PUBLICATIONS

Jaeyeon Jeong et al., "Design of Shape Memory Alloy-Based Soft Wearable Robot for Assisting Wrist Motion", Appl. Sci. 2019, 9, 4025, Sep. 26, 2019.

* cited by examiner

WEARABLE ROBOT FOR ASSISTING UPPER LIMB MOVEMENT BY USING ARTIFICIAL MUSCLE

CROSS-REFERENCE TO RELATED APPLICATION

This application claims priority to and the benefit of Korean Patent Application No. 10-2020-0149279 filed in the Korean Intellectual Property Office on Nov. 10, 2020, Korean Patent Application No. 10-2020-0033601 filed in the Korean Intellectual Property Office on Mar. 19, 2020, and Korean Patent Application No. 10-2019-0179309 filed in the Korean Intellectual Property Office on Dec. 31, 2019, the entire contents of which are incorporated herein by reference.

BACKGROUND

(a) Field

The present disclosure relates to a wearable robot for assisting a movement of an upper limb by using artificial muscle.

(b) Description of the Related Art

Loss of mobility and power of an upper limb may be caused by various reasons, such as peripheral nervous system damage, muscle weakness, tendon disorders, muscle contraction accidents and changes in muscle tone after an accident, or medical disorders, such as cerebral palsy, stroke, traumatic brain injury, and spinal cord injury. Disorders of the upper limb may be attributed to individual causes, but also occur due to a combination of multiple causes.

Some of the neurological disorders are chronic and progressive. Due to this, the independence of the upper limb is lost while a person performs tasks necessary for daily life activities, such as lactation, self-hygiene, dressing, and transfer, and rehabilitation treatment is required. However, in the case of rehabilitation treatment, the number of patients with improved wrist mobility is smaller than the number of patients with improved shoulder or elbow by the shoulder or elbow rehabilitation treatment.

Accordingly, in order to improve wrist mobility of a patient, researchers researched and developed many robot rehabilitation systems. A generally used rehabilitation robot has a solid structure. Further, force exerted on a patient is mainly transmitted by a motor located in each joint. However, the rehabilitation robot has a disadvantage in that the rehabilitation robot is not suitable for a wearable application due to sturdy link, weight of a joint, and a large volume of the rehabilitation robot.

Further, the currently developed rehabilitation robot uses a hard metal material and a motor to create motion or force according to a body movement of a patient wearing the rehabilitation robot. The rehabilitation robot has a large volume and is heavy, so that the rehabilitation robot is usable only at a fixed location, and it is difficult to use the rehabilitation robot for the purpose of assisting the movement of the patient.

In order to solve the problem, a flexible robot technology that utilizes flexible actuators developed based on various materials and robot structures, such as hydraulic pressure, dielectric polymer, ionic polymer, shape memory alloy, polymer, and a nano-material yarn structure, has been used.

The flexible actuator using hydraulic pressure is widely used in wearable flexible robots because of its excellent selective output and response characteristic of contraction/relaxation. However, the wearable flexible robot requires large-scale pneumatic equipment to exhibit high performance, so that it is difficult to downsize the wearable flexible robot. Further, the flexible actuator using dielectric and ionic polymers is capable of implementing large-deformative relaxation motion, but has a limit in output force and difficulty in implementing contraction motion.

The flexible actuator, such as shape memory alloy and nano/polymer type twisted structure polymer, operated by application of heat is smaller and thinner than other materials and is capable of exerting large force and displacement, thereby being suitable for use in wearable robots. However, a response speed of the flexible actuator is low and it is difficult to control the flexible actuator.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a wearable robot for assisting a movement of an upper limb by using artificial muscle, which is capable of effectively imitating not only a movement of a wrist but also various movements of an upper limb of a body by using a flexible actuator that operates similarly to the human body or a movement of the human body and is deformed by heat.

An exemplary embodiment of the present disclosure provides a wearable robot for assisting a wrist, including: a plurality of flexible actuators; and a control unit configured to control any one of the plurality of flexible actuators to be contracted or relaxed according to a wrist movement of a wearer, in which each of the plurality of flexible actuators includes: a driving part which is contractively deformed by a current or transfer heat applied from the control unit or is relaxed when the heat is lost, and a refrigerant circulating part which is implemented to surround the driving part and circulates a refrigerant so that the contractively deformed driving part is cooled under control of the control unit.

The control unit may include: a heating module which applies any one of the current and the transfer heat to the driving part; and a cooling device which discharges the refrigerant to a refrigerant movement tube connected in a first direction so that the refrigerant is circulated in the refrigerant circulating part.

The wearable robot may further include: a first connector connected with a first end point of the driving part; and a second connector connected with a second end point that is opposite to the first end point of the driving part.

The wearable robot may further include: a refrigerant inlet which makes the refrigerant discharged from the cooling device flow into the refrigerant circulating part and is provided at one side of the first connector; and a refrigerant outlet which is provided at one side of the second connector and discharges the refrigerant that has absorbed heat of the driving part in the refrigerant circulating part to the cooling device.

The control unit and each of the plurality of flexible actuators may be connected to the refrigerant movement tube which transfers the refrigerant discharged from the cooling device in a first direction to the refrigerant inlet and transfers the refrigerant that is discharged from the refrigerant outlet and has absorbed the heat to the cooling device, and an electric wire connected to the first end point and the second end point of the driving part through the first connector and the second connector and transfers any one of the current and the transfer heat applied from the heating module to the driving part.

The wearable robot may further include: a robot motion measuring part which measures a movement of the heat-shrinkable artificial muscle wearable robot and is implemented with a flexible strain sensor or an Inertial Measurement Unit (IMU) sensor; and a wearer's intention measuring unit which senses an intention of a wearer wearing the heat-shrinkable artificial muscle wearable robot and is implemented with a pressure sensor or an ElectroMyoGraphy (EMG) sensor.

Another exemplary embodiment of the present disclosure provides a wearable robot for assisting a wrist, including: a first wearing part which is connected with one end of each of a plurality of flexible actuators and is connected with the plurality of actuators; a second wearing part connected with an opposite side of each of the plurality of flexible actuators; and a control unit configured to control each of the plurality of flexible actuators, of which the ends are connected to the first wearing part and the second wearing part, to be contractively deformed or relaxed.

The plurality of flexible actuators may be installed at a predetermined interval on a back of a hand, one flexible actuator may be installed at each of a location of a thumb and a location of a little finger on a palm, and the wearable robot may support a two-degree-of freedom motion of the wrist through the plurality of flexible actuators.

The first wearing part may include: a first sensor which senses a movement of the heat-shrinkable artificial muscle wearable robot; and a second sensor which senses an intensity of force applied to the heat-shrinkable artificial muscle wearable robot.

When the intensity of force sensed by the second sensor is larger than a predetermined threshold intensity, the control unit may restore at least one contractively deformed flexible actuator among the plurality of flexible actuators to an initial state.

Still another exemplary embodiment of the present disclosure provides a wearable robot, which is worn by a wearer and assists a movement of an upper limb of the wearer, the wearable robot including: a plurality of wearing parts worn on a plurality of regions of the upper limb of the wearer; at least one actuator of which ends are connected to a first wearing part and the second wearing part among the plurality of wearing parts, respectively, and which assists the movement of the upper limb by contractive deformation; and a control unit configured to control at least one actuator to be contracted or relaxed according to the movement of the upper limb of the wearer, in which the movement of the upper limb is any one of an elbow bending movement, an elbow unfolding movement, a forearm rotation movement, a finger folding movement, and a finger bending movement.

The plurality of wearing parts may include: a shoulder wearing part worn on a shoulder of the wearer, a forearm wearing part worn on a forearm of the wearer, a wrist wearing part worn on a wrist of the wearer, and a glove wearing part worn on a hand of the wearer.

When the movement of the upper limb is the elbow bending movement, one end of one actuator may be connected to the first wearing part that is the shoulder wearing part and the other end may be connected to the second wearing part that is the forearm wearing part, and the actuator may be contracted under control of the control unit to assist the elbow bending movement of the wearer so that the forearm moves in a direction of the shoulder.

When the movement of the upper limb is the forearm rotation movement, the first wearing part may be the shoulder wearing part and the second wearing part may be the wrist wearing part, and the wearable robot may further include: a first pulley part which is formed at one lateral surface of the forearm wearing part and changes a direction of force applied by the wearer to a forearm rotation movement direction; a second pulley part which is formed at a lateral surface opposite to the one lateral surface and changes the direction of force applied by the wearer to the forearm rotation movement direction; a first connection structure which is connected with one side of a first actuator and is connected to the wrist wearing part through the first pulley part; and a second connection structure which is connected with one side of a second actuator and is connected to the wrist wearing part through the second pulley part.

One end of each of the first actuator and the second actuator may be connected to the shoulder wearing part, and the other end of each of the first actuator and the second actuator may be connected to the connection structure, and when the wearer applies force in a first direction, any one of the first actuator and the second actuator may be contracted under the control of the control unit and rotate the wrist wearing part connected to the connection structure in the first direction to assist a forearm rotation movement.

The pulley part may have a bearing structure that is grooved in a vertical direction to a rotation axis in order to fix the connection structure.

When the movement of the upper limb is a finger folding movement, the first wearing part may be the wrist wearing part and the second wearing part may be the glove wearing part, the wearable robot may further include: one wire part which connects one end of a first actuator attached to a palm portion and one end of a second actuator; and at least one fixing part which fixes the wire part to a thumb of the glove wearing part, and the first actuator and the second actuator may be contracted under the control of the control unit and pull the wire part in the direction of the palm and pull the thumb of the fixing part connected with the wire part in the direction of the palm to assist a folding movement.

When the movement of the upper limb is a finger bending movement, the wearable robot may include a plurality of fixing part installed in the remaining fingers except for the thumb in the glove wearing part, and when the first actuator and the second actuator are contracted under the control of the control unit, the wire part connected with one end of each of the first actuator and the second actuator may be pulled to assist the finger bending movement.

When the movement of the upper limb is a finger unfolding movement, the first wearing part is the wrist wearing part and the second wearing part is the glove wearing part, and the wearable robot may further include: one wire part which connects one end of a first actuator attached to a palm portion and one end of a second actuator; and at least one fixing part which fixes the wire part to a thumb of the glove wearing part, and the first actuator and the second actuator may be relaxed under the control of the control unit and pulls the wire part in the direction of the back of the hand and pulls the finger of the fixing part connected with the wire part in the direction of the back of the hand to assist the unfolding movement.

According to the present disclosure, it is possible to develop artificial muscle which is capable of imitating muscle formed of muscle fibers and motor nerves. That is, it is possible to provide a flexible actuator in the form of small and light artificial muscle which is capable of performing contraction/relaxation movement similar to a movement of the actual muscle of person by using artificial muscle and generating large output.

Further, it is possible to assist a movement of a body by applying an actuator which may be contracted and relaxed by using an elastic body having excellent elasticity and a heat-shrinkable driving device to wearable cloth.

Further, it is possible to accurately imitate a two-degree-of-freedom movement of wrist flexion, extension, radius dislocation, and ulna dislocation of the wrist. That is, it is possible to imitate a movement contracted/relaxed with large displacement and a high-intensive explosive movement by using the driving of a heat-shrinkable flexible actuator driven based on application of heat.

Further, it is possible to accurately imitate a movement of a body through a cloth-type robot that is conveniently worn. Further, it is possible to utilize the wearable robot as a wearable device for assisting daily life of patients who are unable to move or have limited movements and rehabilitating and assisting muscle strength, and it is possible to assist daily life activities for patients who have difficulty in daily activities using the upper limb (elbow and wrist) due to stroke or spinal cord injury.

Further, it is possible to imitate various movements of the upper limb of the body, such as elbow bending, forearm rotation, and finger bending, by using the heat-shrinkable artificial muscle.

Further, it is possible to effectively implement the movement of the upper limb by disposing the artificial muscle to be similar to the deposition of the actual muscle.

Further, it is possible to utilize the wearable robot as a wearable device for assisting daily life of patients who are unable to move or have limited movements and rehabilitating muscle strength.

DETAILED DESCRIPTION OF THE EMBODIMENTS

Figure 1:
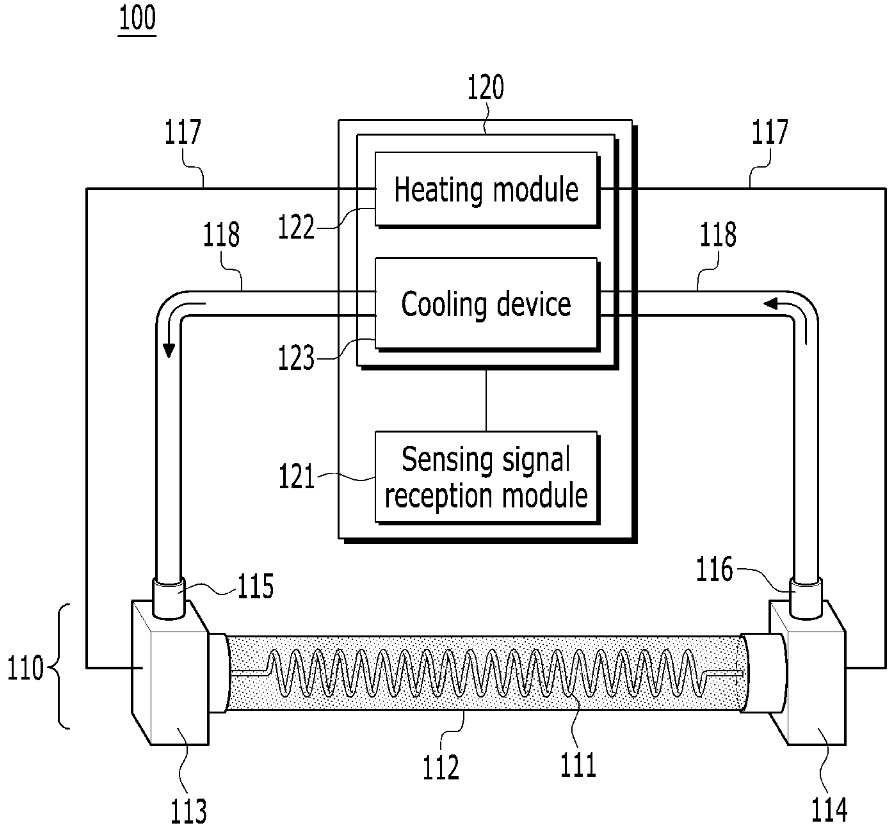
FIG. 1 is a diagram illustrating an example of an artificial muscle type flexible actuator according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

Hereinafter, a wearable robot for assisting a wrist by using heat-shrinkable artificial muscle according to an exemplary embodiment of the present disclosure will be described in detail with reference to the drawings.

FIG. 1 is a diagram illustrating an example of an artificial muscle type flexible actuator according to an exemplary embodiment of the present disclosure.

As illustrated in FIG. 1, a wearable robot 100 for assisting a wrist by using heat-shrinkable artificial muscle includes a flexible actuator 110 implemented in the wearable robot, and a control unit 120 which is not attached to the wearable robot, but controls the flexible actuator 110. The flexible actuator 110 is implemented in the plurality of wearable robots 100, but FIG. 1 illustrates one flexible actuator 110 for convenience of the description.

The flexible actuator 110 that is artificial muscle replacing a muscle function of a person includes a driving part 111 contracted or relaxed under the control of the control unit 120, and a refrigerant circulating part 112 which is formed in the form surrounding the driving part 111 and in which a refrigerant (for example, mineral oil) for cooling heat applied to the driving part 111 flows.

When a current generated in the control unit 120 is applied, or the control unit 120 generates heat and transfer heat is applied, the driving part 111 is heated by the current or the transfer heat. The driving part 111 heated due to the application of the current is contractively deformed by heat, and when the refrigerant flows into the flexible actuator 110 under the control of the control unit 120, the contracted driving part 111 is relaxed according to a cooling process.

Accordingly, the driving part 111 uses a shape memory material or a heat-shrinkable nano/polymer material having excellent deformation recovery. The material of the driving part 111 is not limited to any one material, but in the exemplary embodiment of the present disclosure, for convenience of the description, the present disclosure will be described based on an example in which the driving part 111 is a shape memory alloy coil spring.

A refrigerant circulating part 112 is formed of an elastic material so as to be contracted or relaxed according to the contraction/relaxation of the driving part 111. The elastic material of the refrigerant circulating part 112 is not limited to any one material, but in the exemplary embodiment of the present disclosure, for convenience of the description, the present disclosure will be described based on an example in which the refrigerant circulating part 112 is implemented with a polymer tube. The polymer tube exhibits high elasticity of 300% or more of an initial length, so that the refrigerant circulating part 112 may also be contracted or relaxed according to the contraction/relaxation of the shape alloy memory coil spring, that is, the driving part 111.

In the exemplary embodiment of the present disclosure, an initial diameter of the refrigerant circulating part 112 is implemented with 7 mm, but the present disclosure is not essentially limited thereto. Further, the present disclosure will be described based on an example in which the refrigerant circulating part 112 is implemented in the form of a cylinder so that the refrigerant is capable of circulating. However, the refrigerant circulating part 112 may be implemented in any form as long as the refrigerant is capable of circulating.

Both ends of the driving part 111 are connected to electric wires 117 for applying the current or the transfer heat to the driving part 111. The electric wire 117 is inserted into the refrigerant circulating part 112 through one side of a connector 113 and 114 and is connected with the driving part 111.

A refrigerant inlet 115 which makes the refrigerant flow into the refrigerant circulating part 112 under the control of the control unit 120, and a refrigerant outlet 116 through which the refrigerant that has taken away heat from the driving part 111 while moving through the refrigerant circulating part 112 is discharged to the outside of the refrigerant circulating part 112 are provided at upper ends of the connectors 113 and 114.

Herein, the present disclosure is described based on an example in which the connectors 113 and 114 are poly carbonate, and are implemented with widths and heights of less than 15 mm, but the present disclosure is not essentially limited thereto.

Other ends of the refrigerant inlet 115 and the refrigerant outlet 116 are connected to a cooling device 123 formed of a small pump, a radiator, a Peltier element, and the like provided in the control unit 120. The refrigerant moving a refrigerant movement tube 118 according to the driving of the cooling device 122 flows into the refrigerant circulating part 112 through the refrigerant inlet 115, and the refrigerant discharged through the refrigerant outlet 116 is circulated to return to the cooling device 123 through the refrigerant movement tube 118. In this case, in the case where the refrigerant is circulated by using the cooling device, the control unit 120 is implemented in a small size so that the user carries the control unit 120.

The control unit 120 includes a sensing signal reception module 121, a heating module 122, and the cooling device 123.

The sensing signal reception module 121 receives a movement of the wearable robot 100 from a sensor provided in the wearable robot 100 which is to be described below or a sensing signal obtained by sensing an intention of a wearer wearing the wearable robot 100. The sensing signal reception module 121 transfers a control signal so that the heating module 122 or the cooling device 123 is driven according to the received sensing signal. In this case, the method of driving the heating module 122 or the cooling device 123 based on the information included in the sensing signal or the sensing signal is various, so that in the present exemplary embodiment of the present disclosure, the method is not limited to any one method.

The heating module 122 applies a current to the driving part 111 through the electric wire 117 under the control of the sensing signal reception module 121. Otherwise, the heating module 122 may autonomously generate heat and also apply transfer heat to the driving part 111 through the electric wire 117. When the heating module 122 applies transfer heat to the driving part 111, the heating module 122 is implemented with a material having high thermal conductivity and low resistance, and the kind of material is not limited to any one material.

The cooling device 123 makes the refrigerant flow into the refrigerant circulating part 112 in order to take heat from the driving part 111 relaxed by the current or the transfer heat under the control of the sensing signal reception module 121. Further, the cooling device 123 cools the inflow refrigerant that has absorbed heat and transfers the refrigerant to the refrigerant circulating part 112 again.

To this end, the cooling device 123 may be implemented with a small pump or a radiator, or may be implemented with a Peltier element. When the cooling device 123 is implemented with a small pump or a radiator, the amount of refrigerant to flow into the refrigerant circulating part 112 is small, so that a small pump of $5 \times 5$ $cm^2$ or less may be used.

The method of generating a current by the heating module 122, the method of making the refrigerant flow by the cooling device 123, the method of cooling the refrigerant that has absorbed heat, and the like are executable by various control methods, so that in the exemplary embodiment of the present disclosure, the method is not limited to any one method.

The example in which the flexible actuator 110 is transformed described above will be described with reference to FIGS. 2A and 2B.

Figure 2A:
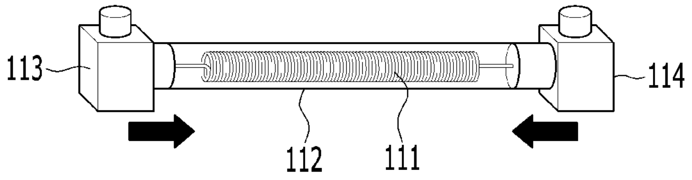
FIGS. 2A and 2B are a diagram illustrating an example of deformation of the flexible actuator according to the exemplary embodiment of the present disclosure.
Figure 2B:
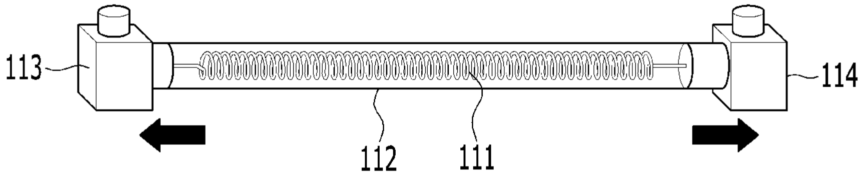

FIGS. 2A and 2B are a diagram illustrating an example of the deformation of the flexible actuator according to the exemplary embodiment of the present disclosure.

When any one of the current and the transfer heat is applied from the control unit 120, the driving part 111 is contracted as illustrated in FIG. 2A. Along with this, the refrigerant circulating part 112 which surrounds the driving part 111 and is provided with the connectors 113 and 114 connected with both ends of the driving part 111 is also contracted together with the driving part 111.

Further, when the refrigerant that has flowed into the refrigerant circulating part 112 collects heat from the driving part 111 to which heat is applied, the driving part 111 and the refrigerant circulating part 112 are relaxed as illustrated in FIG. 2B. For the convenience of description, FIGS. 2A and 2B illustrate only the flexible actuator 110, but the control unit 120 which applies current or transfer heat to the driving part 111 or makes the refrigerant flow into the refrigerant circulating part 112 is provided together.

Herein, in order to design the flexible actuator 110 to be applied to the wearable robot 100, an analysis of an actuator parameter determining maximum force and displacement of the driving part 111 needs to be performed. In the exemplary embodiment of the present disclosure, the present disclosure is described based on the example in which the driving part 111 is the shape memory alloy coil spring, so that a parameter of the shape memory alloy coil spring is analyzed. This will be described with reference to FIG. 3.

Figure 3:
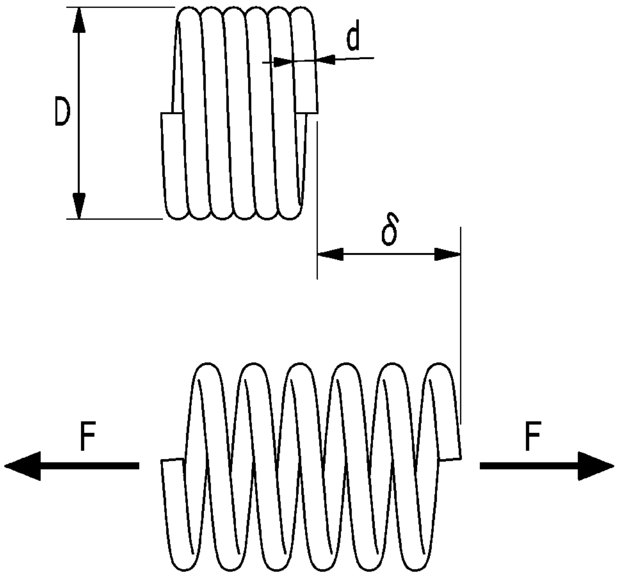
FIG. 3 is a diagram illustrating an example of a parameter of a shape memory alloy coil spring according to the exemplary embodiment of the present disclosure.

FIG. 3 is a diagram illustrating an example of a parameter of the shape memory alloy coil spring according to the exemplary embodiment of the present disclosure.

As illustrated in FIG. 3, in order to design the driving part 111 contracted by heat or relaxed by the refrigerant, it is necessary to determine maximum force and displacement applied to the driving part 111. The relationship between force and displacement is represented by Equation 1 below.

$$F = \frac{Gd^4}{BD^2n}\delta \quad \text{[Equation 1]}$$

Herein, F means force applied to the driving part 111, G means a shear modulus of elasticity of the shape memory alloy, d means a diameter of a wire of the shape memory alloy, D means a diameter of a coil of the shape memory alloy, n means the number of rotations of the coil, and δ means displacement of the shape memory alloy coil spring. The shear modulus of elasticity is a characteristic of a shape memory alloy material itself, and is changed according to a temperature change. D, d, and n may be changed in a process of manufacturing the driving part 111.

Further, the flexible actuator 110 according to the exemplary embodiment of the present disclosure is applied to the wearable robot 100, so that the flexible actuator 110 needs to be designed so as to generate high force in a desired deformation range. In order to generate high force, preload of the driving part 111 needs to be increased, and a target deformation range is determined under a load condition.

Required target force is 10 N per single driving part 111. A target maximum contraction ratio is selected to be larger than 40% of an initial stretched length, which represents a contraction ratio similar to a contraction ratio of human muscle.

Further, when the load of 10 N is applied to the single driving part 111, the target displacement range is selected as 50 mm in the initial stretched length. A maximum target length of the driving part 111 is selected as 150 mm, which is a size suitable to a small wearable robot for a wrist.

Further, one of the main matters to be considered in designing the flexible actuator is that the actuator needs to be as thin as possible so that the wearer easily carries and wears the wearable robot 100. Further, the shape memory alloy is activated by a temperature increase, so that a maximum surface temperature needs to be as low as possible in order to prevent the skin of the wearer wearing the wearable robot 100 from burning.

Next, the wearable robot to which the flexible actuator is applied described above will be described with reference to FIG. 4.

Figure 4:
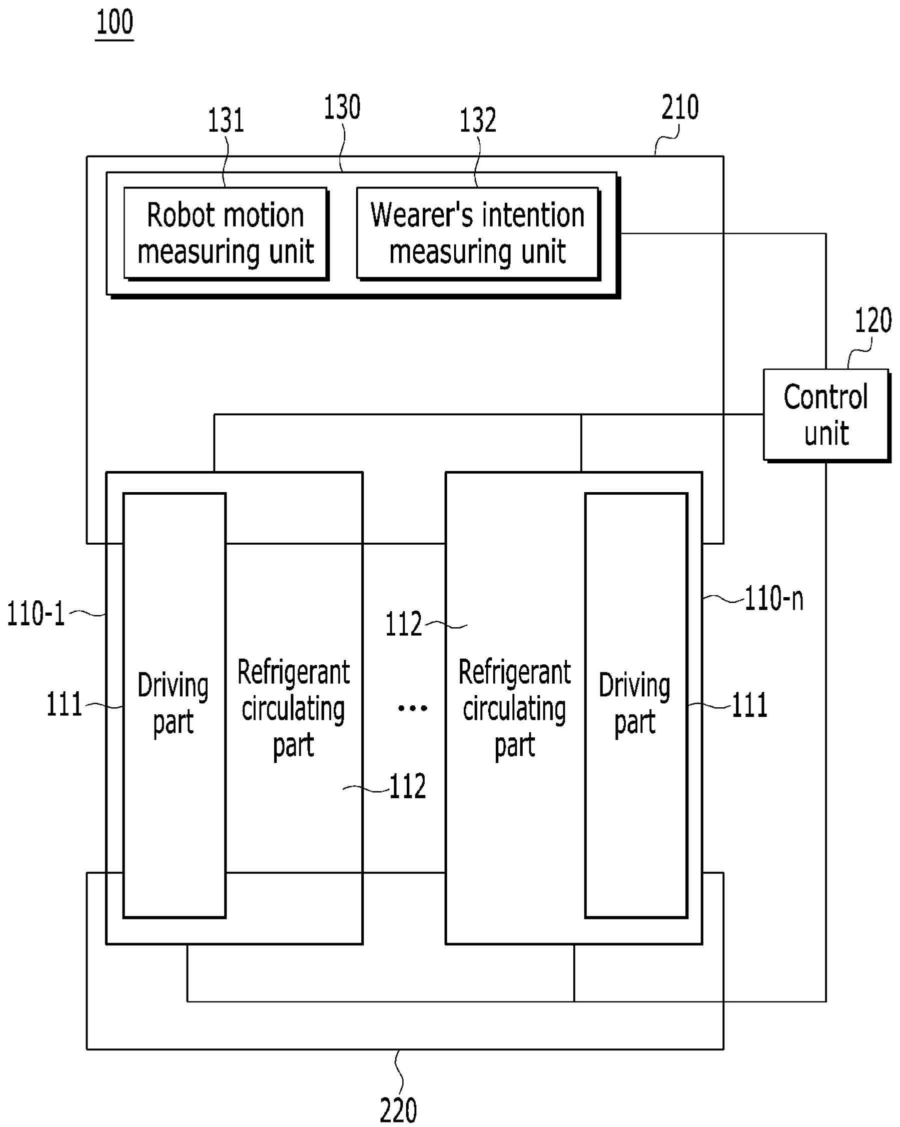
FIG. 4 is a diagram illustrating a structure of a wearable robot to which a flexible actuator is applied according to a first exemplary embodiment of the present disclosure.

FIG. 4 is a diagram illustrating a structure of a wearable robot to which a flexible actuator is applied according to a first exemplary embodiment of the present disclosure.

The wearable robot 100 according to the exemplary embodiment of the present disclosure is the wearable robot for assisting a wrist, and is separated into a first wearing part 210 and a second wearing part 220. Herein, the first wearing part 210 is worn on the wearer's hand in the form of a glove or half glove, and the second wearing part 220 is worn on the wrist of the wearer.

The first wearing part 210 is connected to one end of each of a plurality of actuators 110-1 to **110-*n*. Further, the first wearing part 210 additionally includes a sensing unit 130 which senses an intention of the wearer wearing the wearable robot 100 and a movement of the wearable robot 100**.

The second wearing part 220 is connected to the other end of each of the plurality of actuators 110-1 to **110-*n***.

Each of the plurality of actuators 110-1 to **110-*n* having both ends connected to the first wearing part 210 and the second wearing part 220, respectively, is linked with the control unit 120. Further, the signal sensed by the sensing unit 130 is also transferred to the control unit 120**.

Each of the plurality of actuators 110-1 to **110-*n* is formed of a driving part 111, a refrigerant circulating part 112, connectors 113 and 114, a refrigerant inlet 115, and a refrigerant outlet 116, and an electric wire 117 as described in FIG. 1, but in the exemplary embodiment of the present disclosure, for convenience of the description, the present disclosure is described only based on the driving part 111 and the refrigerant circulating part 112**.

Further, the control unit 120 includes a sensing signal reception module 121, a heating module 122, and a cooling device 123 as described in FIG. 1. In the exemplary embodiment of the present disclosure, the present disclosure is described based on the example in which one control unit 120 controls the plurality of actuators 110-1 to **110-*n*, but the control unit 120 may also be connected to each of the plurality of actuators 110-1 to 110-*n***.

When a current or transfer heat is applied under the control of the control unit 120, the driving part 111 is contractively deformed by the current or the transfer heat to be contracted. Further, when the refrigerant flows into the refrigerant circulating part 112 surrounding the driving part 111 through a cooling process under the control of the control unit 120, the driving part 111 is relaxed. The driving part 111 and the refrigerant circulating part 112 are implemented with an elastic material so as to be repeatedly contracted and relaxed.

The sensing part 130 includes a robot motion measuring unit 131 and a wearer's intention measuring unit 132 in order to recognize an intention of a wearer wearing the wearable robot 100 and precisely control the wearable robot 100.

The robot motion measuring unit 131 measures a movement of the wearable robot 100 worn on the wrist and the hand. Further, movement information of the wearable robot 100 measured by the robot motion measuring unit 131 is transferred to the control unit 120 to be used as sensing data for controlling the flexible actuator 110. In this case, the sensing unit 130 needs to maintain a flexible characteristic in order for the wearable robot 100 to accurately imitate two-degree-of-freedom movement of the wearer.

Accordingly, in the exemplary embodiment of the present disclosure, the present disclosure is described based on an example in which the robot motion measuring unit 131 is implemented with a flexible strain sensor or a small Inertial Measurement Unit (IMU) sensor. Through this, in order to measure the movement of the wearable robot 100, the robot motion measuring unit 131 may directly measure a length of the driving part 111 or directly measure a movement of a body portion of the wearer. The method of measuring the movement by each sensor has been already known, so that a detailed description thereof will be omitted in the exemplary embodiment of the present disclosure.

Further, in order to check whether the wearable robot 100 implements the movement, the sensing unit 130 collects an intention of the wearer as wearer's intention information through the wearer's intention measuring unit 132. As the method of measuring the intention of the wearer through the wearer's intention measuring unit 132, a method of providing a signal by using a button, a method of recognizing a movement of the wearer through an attachment of a pressure sensor, a method of recognizing an electromyogram signal by using an ElectroMyoGraphy (EMG) sensor, and the like may be used.

That is, the intention of the wearer may be measured by inputting wrist information to be moved by directly pressing a button by the wearer or recognizing an electromyogram signal of the wearer. Each method is the already known content, so that a detailed description thereof will be omitted in the exemplary embodiment of the present disclosure.

The movement of the wearable robot 100 and the intention information of the wearer measured by the sensing unit 130 are transferred to the control unit 120 as a sensing signal. The control unit 120 may apply a current/heat to the flexible actuator 110 or generate a control signal so that the refrigerant is circulated based on the sensing signal to control the movement of the driving part 111.

The movement of the flexible actuator 110 operated by the control unit 120 may generate a body movement of the wearer wearing the wearable robot 100.

For example, wrist movements are required for daily activities, such as opening a door by the user, lifting a spoon or fork to eat food, and handling objects. Accordingly, the wearable robot 100 according to the exemplary embodiment of the present disclosure needs to provide the sufficient amount of torque and a joint Range of Motion (ROM) for the two-degree-of-freedom movement of flexion/extension and ulna/radiation deviation.

In the exemplary embodiment of the present disclosure, FIG. 4 illustrates only the measuring units, that is, the sensors, for sensing the movement of the wearable robot 100 and the intention information of the wearer in the sensing unit 130, but another sensor for sensing an intensity of force applied to the wearable robot 100 may be added. The added sensor may sense the intensity of force applied to the wearable robot 100 by various methods, so that the method is not limited to any one method in the exemplary embodiment of the present disclosure.

When the wearer of the wearable robot 100 is a stiff patient or a patient with severe joint contracture, the patient may apply large force regardless of the intention of the wearer to the wearable robot 100. Otherwise, even with the intention of the wearer, larger force than generally applied force may be applied.

Accordingly, even though unintentional large force or larger force than generally applied force is applied to the wearable robot 100, the control unit 120 needs not to reflect the degree of contractive deformation or the degree of relaxation corresponding to the applied force to the flexible actuator 110.

Accordingly, the wearable robot 100 sets a threshold intensity in advance, and checks whether the intensity of force applied to the wearable robot 100 sensed by the added sensor is larger than the preset threshold intensity. When the intensity of force applied to the wearable robot 100 is larger than the preset threshold intensity, the control unit 120 may controls at least one flexible actuator 110, which has been contractively deformed or relaxed, among the plurality of flexible actuators 110 to be restored to an initial state. Herein, the initial state of the flexible actuator 110 means the state of the flexible actuator 110 when the driving part 111 is relaxed without being contracted by heat.

An example of a target wrist motion of the wearer when the user performs rehabilitation training by wearing the wearable robot 100 will be described with reference to FIGS. 5A to 5D.

FIGS. 5A to 5D are a diagram illustrating an example of a target motion of a wrist according to the first exemplary embodiment of the present disclosure.

The wrist has several joints including the wrist muscle and joint, the intercarpal joint, and five carpal joints that connect the hand carpal and the hand. The joint can be approximated as a single wrist joint with two unaligned axes of rotation.

Figure 5A:
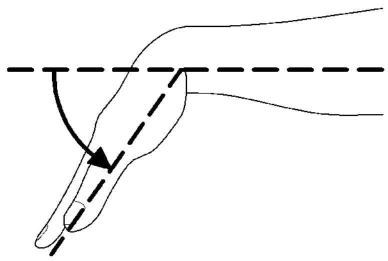
FIGS. 5A to 5D are a diagram illustrating an example of target motions of a wrist according to the first exemplary embodiment of the present disclosure.
Figure 5B:
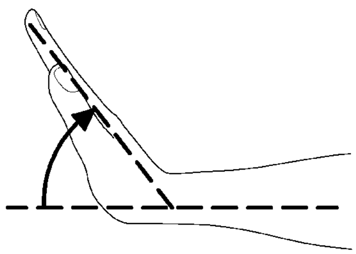

As illustrated in FIG. 5A, when the wrist is bent (flex) so that the palm is close to a front surface of the forearm, uplift is generated. Further, as illustrated in FIG. 5B the extension is the movement of the wrist in the opposite direction to the direction of the wrist bending.

Figure 5C:
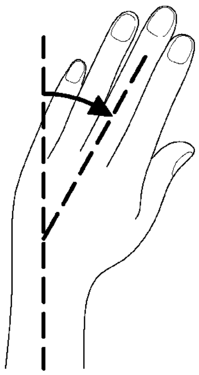
Figure 5D:
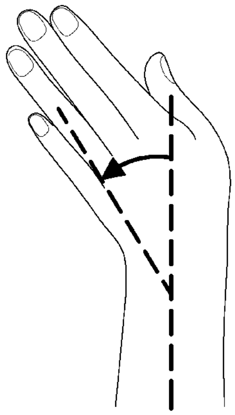

The ulnar deviation that is also known as ulna flexion illustrated in FIG. 5C is the movement of the wrist toward the ulna bone. Further, as illustrated in FIG. 5D, the movement of the wrist toward the radius bone that is the direction opposite to the ulna bone causes ray deviation.

As described above, flexion and elongation occur within the transverse axis, but the ulna and radius-directional deviation occurs within the anteroposterior axis. The flexion and the extension are antagonistic movements in the same plane, and the ulna and the radial deviation are antagonistic in other planes.

Next, an example in which the wearer wears the wearable robot 100, and the exemplary embodiment in which the wearer wearing the wearable robot 100 performs the target motions described with reference to FIGS. 5A to 5D will be described with reference to FIGS. 6A to 7D.

Figure 6A:
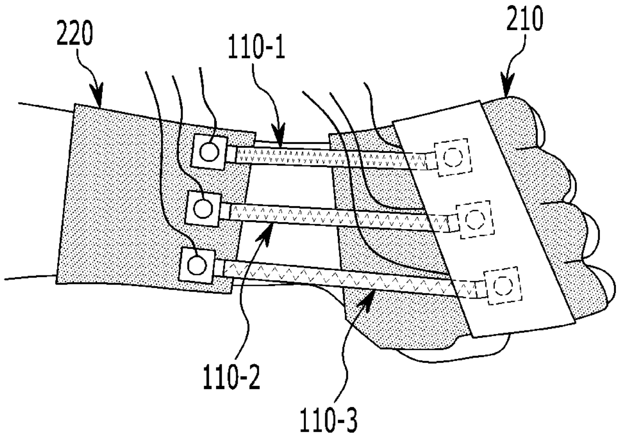
FIGS. 6A to 6C are a diagram illustrating an example of the wearable robot manufactured according to the first exemplary embodiment of the present disclosure.
Figure 6B:
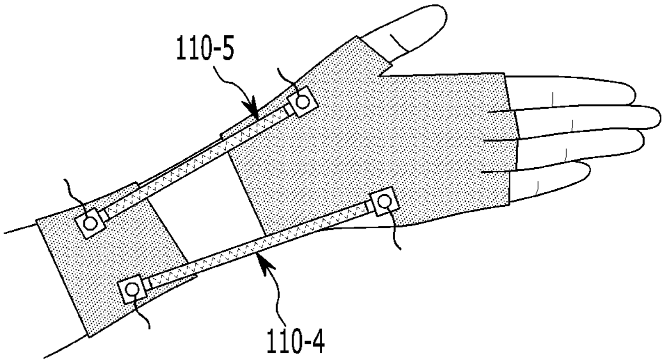
Figure 6C:
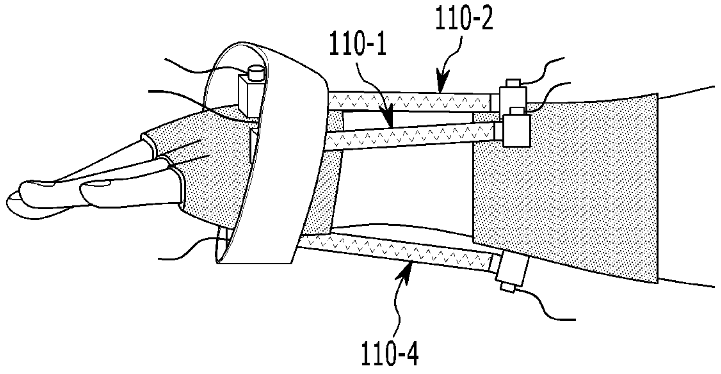

FIGS. 6A to 6C are a diagram illustrating an example of the wearable robot manufactured according to the first exemplary embodiment of the present disclosure.

As illustrated in FIGS. 6A to 6C, the wearable robot 100 is separated into the first wearing part 210 and the second wearing part 220, and both ends of each of the actuators 110-1 to 110-5 are fixed to two wearing parts 210 and 220 to implement the movement of the wrist through the contraction and the relaxation of the actuator 110.

In order to achieve two-degree-of freedom motion of the wrist, as illustrated in FIGS. 6A to 6C, the wearable robot 100 according to the exemplary embodiment of the present disclosure locates the actuators 110-1 to 110-5 at various locations.

The exemplary embodiment of the present disclosure will be described based on the example in which five flexible actuators 110-1 to 110-5 are included in the wearable robot 100. First, as illustrated in FIG. 6A, three flexible actuators 110-1 to 110-3 are formed on the back of the wearer's hand. Further, as illustrated in FIG. 6B, one flexible actuator 110-4 is installed starting from a location away from the thumb in the wrist direction to one end of the second wearing part 220 on the palm. Similarly, another flexible actuator 110-5 is installed starting from a location away from the little finger by a predetermined distance in the wrist direction to one end of the second wearing part 220 on the palm.

Driven force or the driving range is adjusted according to the attachment locations and the number of flexible actuators 110-1 to 110-5. When several flexible actuators 110-1 to 110-5 are disposed, the flexible actuators 110-1 to 110-5 are individually controlled through the control unit 120 to freely implement any wrist movement of two-degree-of freedom.

Another important matter to be considered when the wearable robot 100 is designed is that the wearable robot 100 needs to be light and easy to wear so that the wearer can perform daily activities related to wrist movement. Through this, the wearable robot 100 may be utilized as the robot for assisting the wrist movement of the wearer and providing force for muscular strength rehabilitation. Further, the wearable robot 100 is manufactured in a cloth-wearing type and is designed in a structure which a wearer can easily put on and take off like clothes, so that it is easy to attach and detach the wearable robot 100 and it is possible to keep wearing the wearable robot 100 in daily life.

FIGS. 7A to 7D are a diagram illustrating an example of driving of the wearable robot according to the first exemplary embodiment of the present disclosure.

Figure 7A:
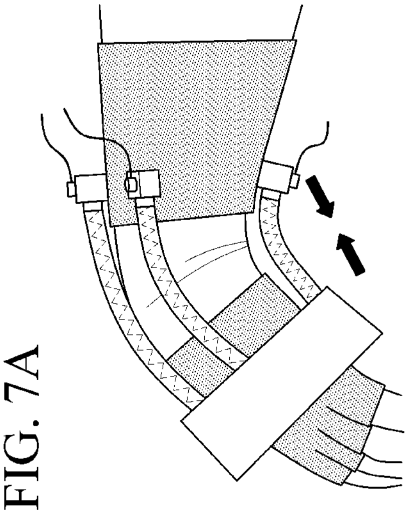
FIGS. 7A to 7D are a diagram illustrating an example of driving of the wearable robot according to the first exemplary embodiment of the present disclosure.
Figure 7B:
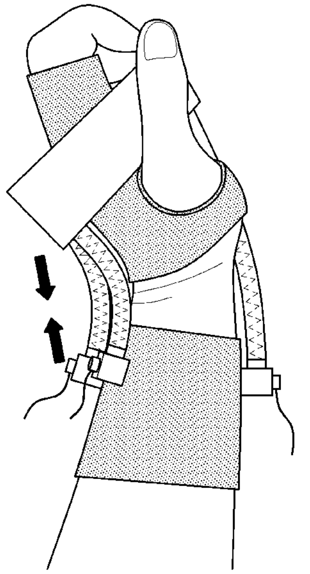

As illustrated in FIG. 7A, when the wearer bends the wrist, three flexible actuators 110-1 to 110-3 provided on the back of the hand of the wearable robot 100 are driven to implement a wrist flexion movement. Further, as illustrated in FIG. 7B, when the wearer puts the back of the hand behind, a driving device of each of the three flexible actuators 110-1 to 110-3 of the back of the hand is contracted to implement a wrist extension movement.

Figure 7C:
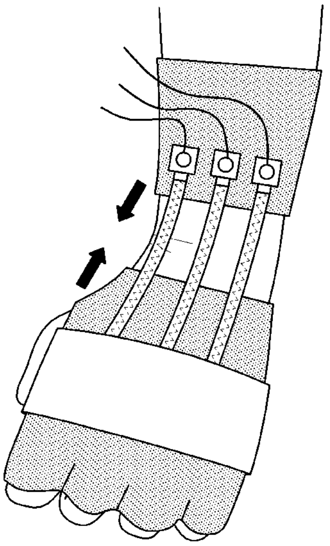
Figure 7D:
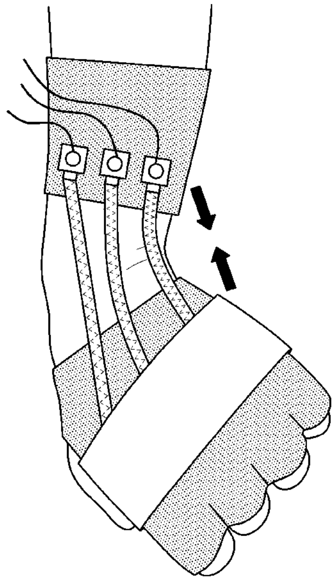

Similarly, when the driving part of the flexible actuator in the portion of the thumb is driven according to the movement of the wearer, the wearable robot 100 may implement an ulna dislocation motion of the wrist as illustrated in FIG. 7C. Further, when the driving part of the flexible actuator attached to the portion of the little finger is operated according to the movement of the wearer, the wearable robot 100 may implement a radius dislocation motion of the wrist as illustrated in FIG. 7D.

FIGS. 6A to 7D illustrate only the flexible actuators and some wires in order to represent the state of the flexible actuators according to the wearing of the wearable robot 100, but the control unit 120 connected to the flexible actuator 110, the electric wire 117, and the refrigerant movement tube 118 needs to be essentially provided.

Figure 8A:
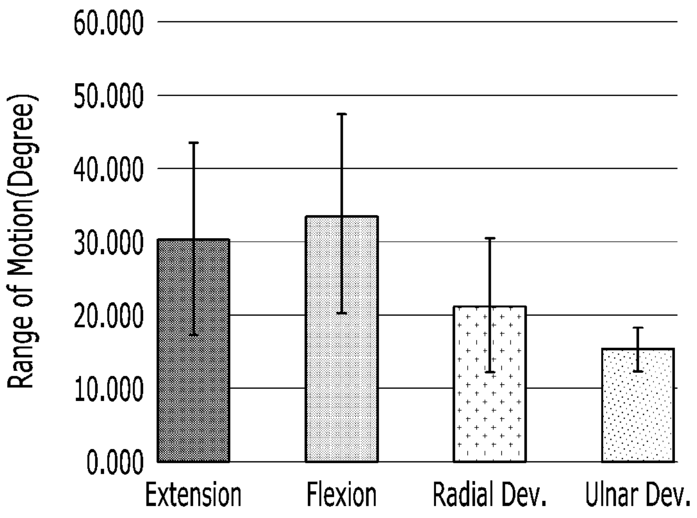
FIGS. 8A and 8B are a graph illustrating an average joint range of motion for four wrist motions according to the first exemplary embodiment of the present disclosure.
Figure 8B:
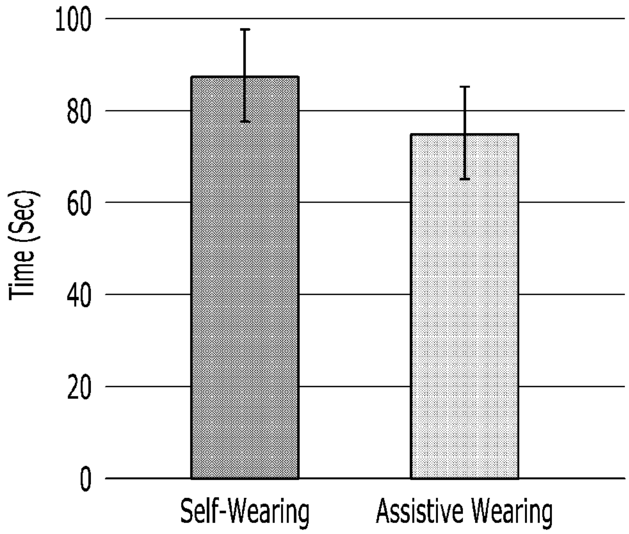

FIGS. 8A and 8B are a graph illustrating an average joint range of motion for four wrist motions according to the first exemplary embodiment of the present disclosure.

The wearable robot 100 focuses on the patients having difficulties in operating the wrist, so that wearability and the joint ROM are also important factors to be considered. As the result of the experiment performed in order to observe the performance of the factor, FIG. 8A represents average joint angle ranges for four wrist motions.

The average joint ROMs of five target subjects are 33.8, 30.4, 21.4, and 15.4 for flexion, extension, radius deviation, and ulnar deviation, respectively. The largest joint ROM was measured in the flexion motion, and the smallest joint ROM was measured in the ulnar deviation motion.

The standard deviation for the joint FOM of the flexion and the extension motion is around 13, which is the direction in which there is a large joint ROM. The minimum standard deviation was observed in the ulnar deviation at about 3.

FIG. 8B illustrates an average wearing time measured in the two experiments. The average time spent on self-wearing was measured as 87 seconds. The average assistive wearing time was measured as 75 seconds.

The most time-consuming step was inserting a finger into the glove in both experiments. The fact that it takes less than 2 minutes to wear the wearable robot 100 means that the wearable robot system according to the exemplary embodiment of the present disclosure can be easily worn. In particular, the experimental result of the self-wearing means that the wearable robot 100 according to the exemplary embodiment of the present disclosure can be worn by the patient for about 80 to 90 seconds with one hand. Accordingly, the patient having mobility impairments on the wrist can wear the robot without external support.

As described above, in the exemplary embodiment of the present disclosure, a refrigerant circulating structure is applied to the wrist-type wearable robot for fast cooling the heat-shrinkable driving device of which the shape is changed by heat. Further, by applying the flexible actuator to the wearable robot, the wearable robot enables the wearer wearing the wearable robot to perform contraction/relaxation motion of the wrist muscle similar to the movement of the human muscle to accurately imitate the movement of the wrist of the person.

According to the exemplary embodiment of the present disclosure, the refrigerant circulating system for fast cooling is introduced to the heat-shrinkable driving part which is capable of generating large displacement and force through heat, so that rapid contraction/relaxation motions and repetitive/endurable motions are possible, and when the flexible actuator is applied to the wearable robot, it is possible to implement the wearable robot which is flexible and is capable of imitating the movement of the wrist without interrupting the movement of the person.

The driving part of the flexible actuator suggested in the exemplary embodiment of the present disclosure may include a heat-shrinkable driving part directly generating contraction/relaxation, a tube-type elastic part used as a refrigerant circulating passage for fast cooling, a refrigerant circulating part for circulating the refrigerant, and a control unit controlling the movement by applying heat to the driving part.

Further, the wrist wearable robot to which the flexible actuator is applied includes a glove wearing part worn on the hand in the form of a glove, and a wrist wearing part worn in the form of a band over the wrist, so that the wearer may easily wear the wearable robot.

Next, a wearable robot for assisting a movement of an upper limb by using artificial muscle according to a second exemplary embodiment of the present disclosure will be described in detail with reference to the drawings.

Figure 9:
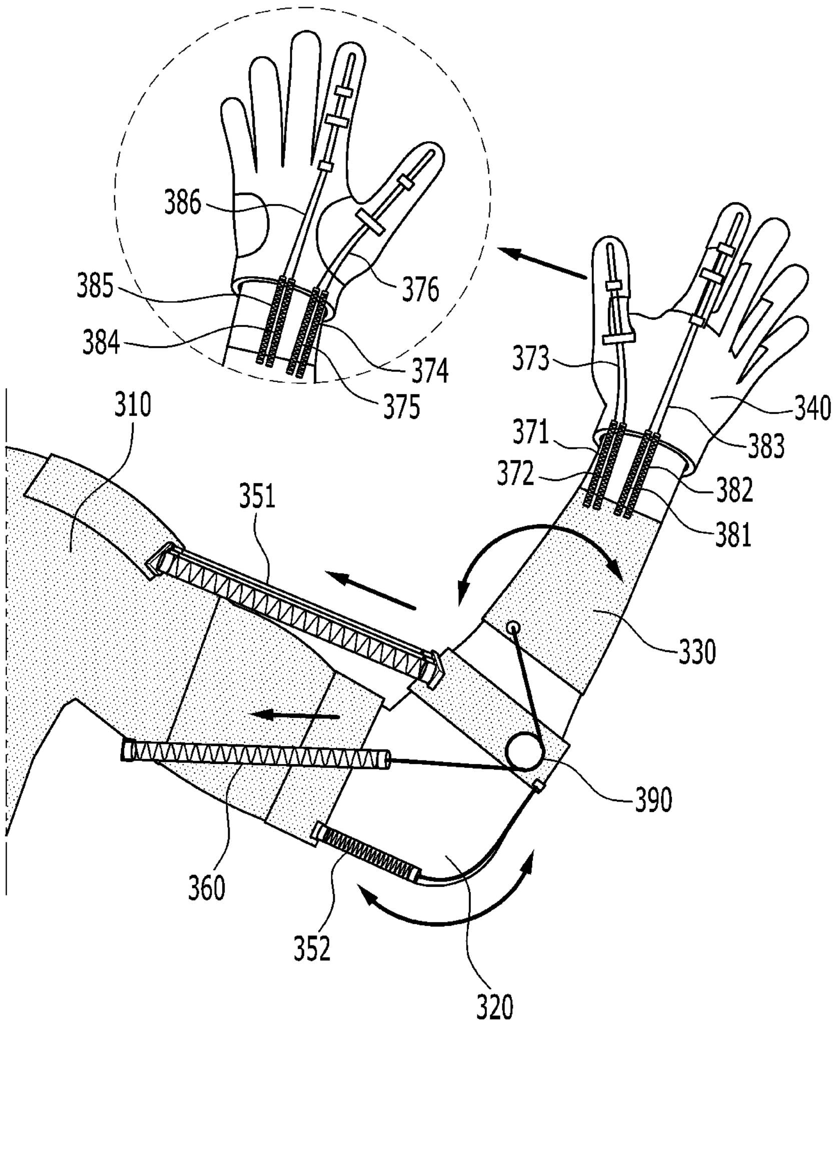
FIG. 9 is a diagram illustrating an example of a wearable robot according to a second exemplary embodiment of the present disclosure.

FIG. 9 is a diagram illustrating an example of a wearable robot according to a second exemplary embodiment of the present disclosure.

As illustrated in FIG. 9, a wearable robot 300 for assisting a movement of an upper limb by using artificial muscle (hereinafter, for convenience of the description, referred to as the "wearable robot") includes a plurality of wearing parts 310 to 340, and a plurality of flexible actuators (hereinafter, for convenience of the description, referred to as the "actuators") 350 to 380 one end of which is connected to the wearing part, and a control unit controlling each of the actuators 350 to 380 which are not illustrated in the drawing.

The plurality of wearing parts 310 to 340 includes a shoulder wearing part 310 for fixing the wearable robot 300 by using the shoulder bone of a patient, and a forearm wearing part 320 worn under the forearm of the patient. Further, the plurality of wearing parts 310 to 340 includes a wrist wearing part 330 fixed to the wrist of the patient, and a glove wearing part 340 worn on the hand like a glove.

When an electric signal is applied to the artificial muscle, that is, the actuators 350 to 380, replacing the muscle function of the person, from the control unit electrically connected with the actuators 350 to 380, the driving part is heated with electrical heat according to the application of the current to be contracted. Further, when the refrigerant flows into the actuators 350 to 380 under the control of the control unit, the driving part that has been contractively deformed according to a cooling process is relaxed.

To this end, each of the actuators 350 to 380 includes the driving part which is contracted or relaxed under the control of the control unit, and a refrigerant circulating part which is formed in the form surrounding the driving part and in which the refrigerant (for example, mineral oil) for cooling heat applied to the driving device flows. Further, an electric wire for applying a current or transfer heat to the driving part may be connected to both ends of the driving part.

The present disclosure will be described based on the example in which the actuators 350 to 380 are divided into the elbow actuator 350, the forearm rotation actuator 360, the thumb actuator 370, and the index finger actuator 380 according to the attachment location of the actuator.

Herein, the elbow actuator 350 is formed of one pair of elbow bending actuator 351 and an elbow unfolding actuator 352 according to the imitation movement. Similarly, the forearm rotation actuator 360 is formed of a pair of a first forearm rotation actuator 361 and a second forearm rotation actuator 362 according to a rotation direction.

Both sides of the elbow bending actuator 351 are connected to the shoulder wearing part 310 and the forearm wearing part 320, respectively. In the elbow bending actuator 351, the driving part configuring the elbow bending actuator 351 is contracted or relaxed under the control of the control unit to imitate the bending movement of the elbow of the patient.

Further, both sides of the elbow unfolding actuator 352 are connected to the back of the shoulder wearing part 310 and the forearm wearing part 320, respectively. In the elbow unfolding actuator 351, the driving part configuring the elbow unfolding actuator 352 is contracted or relaxed under the control of the control unit to mainly imitate the unfolding movement of the elbow of the patient.

The forearm rotation actuator 360 is formed of two actuators, that is, a pair of a first forearm rotation actuator 361 and a second forearm rotation actuator 362. One side of each forearm rotation actuator 360 is fixed to the lower end of the shoulder wearing part 310, and the other side of each forearm rotation actuator 360 is fixed to the wrist wearing part 330 over the forearm wearing part 320.

The first forearm rotation actuator 361 is installed to be close to the body so as to imitate the rotation when the patient rotates the forearm from a reference location to the inside of the body. The second forearm rotation actuator 362 is installed to be farther away from the torso than the position of the first forearm rotation actuator 361 so as to imitate the rotation when the patient rotates the forearm from a reference location to the outside of the body.

The forearm rotation actuator 360 is contracted or relaxed under the control of the control unit to imitate the left-right rotation movement of the forearm of the patient. In the forearm rotation actuator 360, a pulley part 390 which changes a force direction to a rotation direction may be added in order to imitate the rotation movement of the forearm.

The thumb actuator 370 (371 to 376) and the index finger actuator 380 (381 to 386) are attached to the palm and the back of the hand to imitate the unfolding movement of the thumb and the index finger, or imitate the bending movement of the thumb and the bending movement of the index finger, respectively.

That is, one side of the thumb actuator 370 and one side of the index finger actuator 380 are fixed to the wrist wearing portion 330 in the palm portion, and the other side of the thumb actuator 370 and the other side of the index finger actuator 380 are fixed to the thumb and the index finger of the glove wearing part 340, respectively. The thumb actuator 370 and the index finger actuator 380 are contracted under the control of the control unit to imitate the bending movement of the thumb and the bending movement of the index finger.

Further, the thumb actuator 370 and the index finger actuator 380 are separately attached to the back portion of the hand. That is, the thumb actuator 370 attached to the back portion of the hand imitates the unfolding movement of the thumb finger through the relaxation of the driving part. Further, the index finger actuator 380 attached to the back portion of the hand may imitate the unfolding movement of the index finger through the relaxation of the driving part.

Herein, the index finger actuator 380 may imitate the bending movement of the middle finger, the ring finger, and the little finger by using the same principle.

Each of the wearing portions 310 to 340 may be manufactured of a cloth material, such as nylon and cotton, in consideration of wearing convenience of the patient and weight decrease. Further, in order to prevent sweating when the patient wears the wearable robot 300, each of the wearing portions 310 to 340 may be manufactured of a cloth material having a mesh structure and excellent air permeability. However, large force is applied to the portion connected with each of the actuators 350 to 380 in each of the wearing parts 310 to 340, so that the connection portion may be manufactured of a hard material (for example, plastic and metal).

The structure of the wearable robot 300 will be described with reference to FIG. 10.

Figure 10:
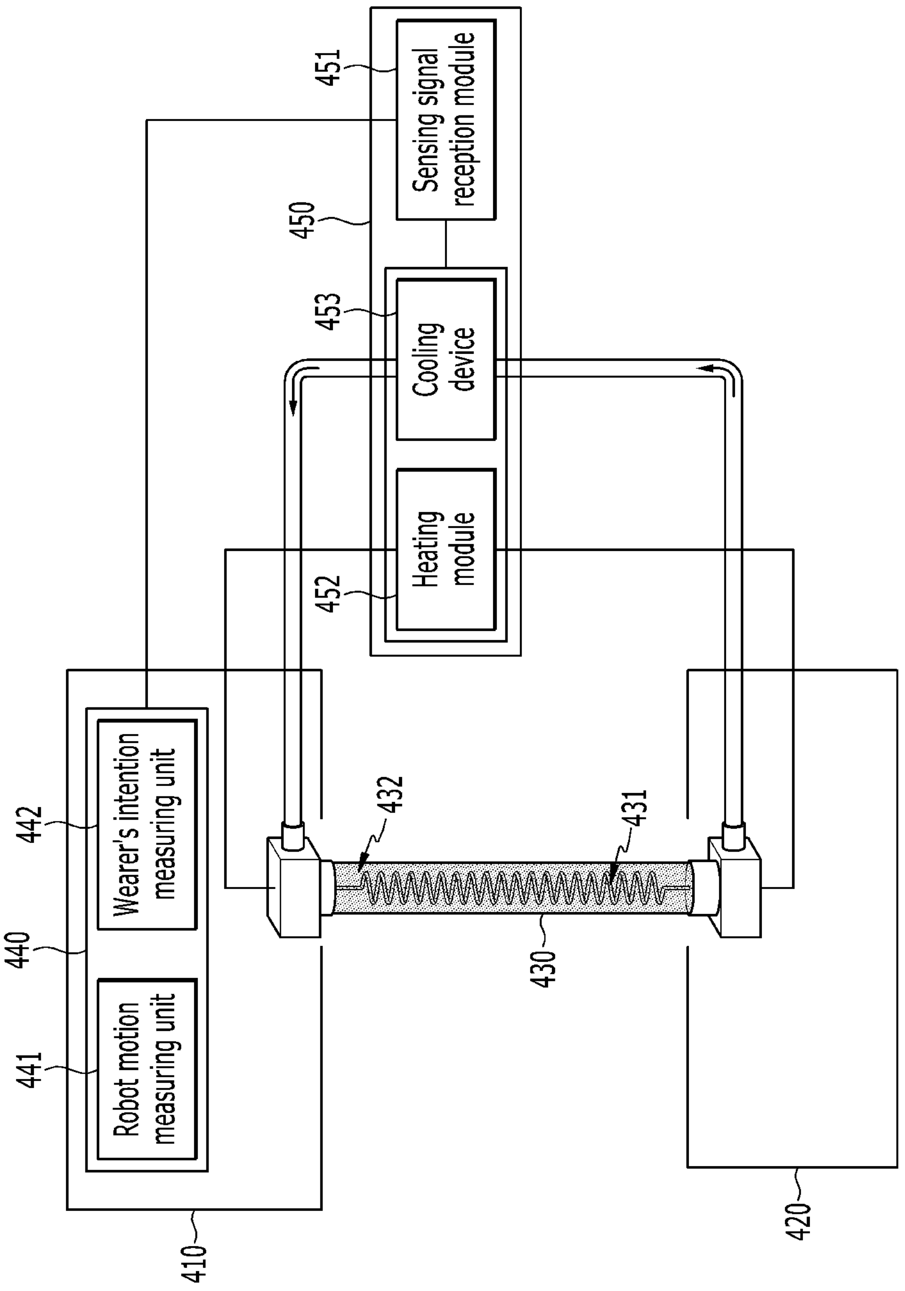
FIG. 10 is a diagram illustrating a structure of the wearable robot using artificial muscle according to the second exemplary embodiment of the present disclosure.

FIG. 10 is a diagram illustrating a structure of the wearable robot using artificial muscle according to the second exemplary embodiment of the present disclosure.

As illustrated in FIG. 10, the wearable robot 300 according to the exemplary embodiment of the present disclosure is the wearable robot for implementing the movements of the elbow, the forearm, and the finger, and both ends of the wearable robot 300 are connected to two wearing parts, respectively. In the second exemplary embodiment of the present disclosure, for convenience of the description, two wearing parts are referred to as a first wearing part 410 and the second wearing part 420.

When the wearable robot 300 is the robot for implementing the movement of the elbow, the first wearing part 410 is the shoulder wearing part 310 worn on the shoulder of the wearer and the second wearing part 420 corresponds to the forearm wearing part 310 worn on the forearm of the wearer.

Further, when the wearable robot 300 is the robot for implementing the movement of the forearm, the first wearing part 410 is the shoulder wearing part 310 worn on the shoulder of the wearer and the second wearing part 420 corresponds to the wrist wearing part 330 worn on the wrist of the wearer.

Similarly, when the wearable robot 300 is the robot for implementing the movement of the finger, the first wearing part 410 is the forearm wearing part 320 worn on the forearm of the wearer and the second wearing part 420 corresponds to the glove wearing part 340 worn on the hand of the wearer in the form of the glove.

The first wearing part 410 is connected with one end of at least one actuator 430. Further, the first wearing part 410 additionally includes a sensing unit 440 which senses an intention of the wearer wearing the wearable robot 300 and a movement of the wearable robot 300.

The second wearing part 420 is connected with the other end of at least one actuator 430.

At least one actuator 430, both ends of which are connected to the first wearing part 410 and the second wearing part 420, respectively, is linked with a control unit 450. Further, the signal sensed by the sensing unit 440 is also transferred to the control unit 450.

Each actuator 430 is formed of a driving part, a refrigerant circulating part, a connector, a refrigerant inlet, a refrigerant outlet, and an electric wire, but in the exemplary embodiment of the present disclosure, for convenience of the description, only the driving part 431 and the refrigerant circulating part 432 are illustrated and described.

The sensing part 440 includes a robot motion measuring unit 441 and a wearer's intention measuring unit 442 in order to recognize an intention of a wearer wearing the wearable robot 300 and precisely control the wearable robot 300.

The robot motion measuring unit 441 measures a movement of the wearable robot 300. Further, movement information of the wearable robot 300 measured by the robot motion measuring unit 441 is transferred to the control unit 450 to be used as sensing data for controlling the actuator 430. In this case, the sensing unit 440 needs to maintain a flexible characteristic in order for the wearable robot 300 to accurately imitate the movement of the wearer.

In the exemplary embodiment of the present disclosure, the present disclosure is described based on an example in which the robot motion measuring unit 441 is implemented with a flexible strain sensor or a small IMU sensor. In order to measure the movement of the wearable robot 300, the robot motion measuring unit 441 may directly measure a length of the driving part 431 or directly measure a movement of a body portion of the wearer. The method of measuring the movement by each sensor has been already known, so that a detailed description thereof will be omitted in the exemplary embodiment of the present disclosure.

Further, in order to check the implementation of the movement of the wearable robot 300, the sensing unit 440 collects an intention of the wearer as wearer's intention information through a wearer's intention measuring unit 442.

As the method of measuring the intention of the wearer through the wearer's intention measuring unit 442, a method of providing a signal by using a button, a method of recognizing a movement of the wearer through an attachment of a pressure sensor, a method of recognizing an intention by measuring a movement of the wearer by using a displacement sensor, a method of recognizing an electromyogram signal by using an EMG sensor, and the like may be used.

That is, when the wearer wearing the wearable robot 300 inputs elbow, forearm, or finger information to be moved by directly pressing the button, the wearer's intention measuring unit 442 may measure the intention of the wearer based on the input information. Otherwise, the wearer's intention measuring unit 442 may also measure the intention of the wearer by recognizing an electromyogram signal of the wearer. Each method is the already known content, so that a detailed description thereof will be omitted in the exemplary embodiment of the present disclosure.

The movement of the wearable robot 300 and the intention information of the wearer measured by the sensing unit 440 are transferred to the control unit 450 as a sensing signal. The control unit 450 may apply a current/heat to the actuator 430 or generate a control signal so that the refrigerant is circulated based on the sensing signal to control the movement of the driving part 431.

In the exemplary embodiment of the present disclosure, FIG. 10 illustrates only the measuring units, that is, the sensors, for sensing the movement of the wearable robot 300 and the intention information of the wearer in the sensing unit 440, but another sensor for sensing an intensity of force applied to the wearable robot 300 may be added. The added sensor may sense the intensity of force applied to the wearable robot 300 by various methods, so that the method is not limited to any one method in the exemplary embodiment of the present disclosure.

The control unit 450 includes a sensing signal reception module 451, a heating module 452, and a cooling device 453. In the exemplary embodiment of the present disclosure, the present disclosure is described based on an example in which one control unit 450 controls one actuator 430, but one control unit 450 may control the plurality of actuators or the control unit 450 may also be connected to each of the plurality of actuators.

When a current or transfer heat is applied under the control of the control unit 450, the driving part 431 is contractively deformed by the current or the transfer heat to be contracted. Further, when the refrigerant flows into the refrigerant circulating part 432 surrounding the driving part 431 through a cooling process under the control of the control unit 450, the contracted driving part 431 is relaxed. The driving part 431 and the refrigerant circulating part 432 are implemented with an elastic material so as to be repeatedly contracted and relaxed, and the material is not limited to any one material.

The movement of the actuator 430 operated by the control unit 450 may generate a body movement of the wearer wearing the wearable robot 300.

For example, forearm, elbow, or finger movements are required for daily activities, such as opening a door by the user, lifting a spoon or fork to eat food, and handling objects. Accordingly, the wearable robot 300 according to the exemplary embodiment of the present disclosure needs to provide the sufficient amount of torque and a joint ROM for the two-degree-of-freedom movement of flexion/extension and ulna/radiation deviation.

To this end, the control unit 450 includes the sensing signal reception module 451, the heating module 452, and the cooling device 453.

The sensing signal reception module 451 receives a movement of the wearable robot 300 from a sensor provided in the wearable robot 300 or a sensing signal obtained by sensing an intention of the wearer wearing the wearable robot 300. The sensing signal reception module 451 transfers a control signal so that the heating module 452 or the cooling device 453 is driven according to the received sensing signal. In this case, the method of driving the heating module 452 or the cooling device 453 based on the information included in the sensing signal or the sensing signal is various, so that in the present exemplary embodiment of the present disclosure, the method is not limited to any one method.

The heating module 452 applies a current to the driving part 431 through the electric wire under the control of the sensing signal reception module 451. Otherwise, the heating module 452 may autonomously generate heat and also apply transfer heat to the driving part 431 through the electric wire. When the heating module 452 applies transfer heat to the driving part 431, the heating module 452 is implemented with a material having high thermal conductivity and low resistance, and the kind of material is not limited to any one material.

The cooling device 453 makes the refrigerant flow into the refrigerant circulating part 432 in order to take heat from the driving part 431 relaxed by the current or the transfer heat under the control of the sensing signal reception module 451. Further, the cooling device 453 cools the inflow refrigerant that has absorbed heat and transfers the refrigerant to the refrigerant circulating part 432 again.

To this end, the cooling device 453 may be implemented with a small pump or a radiator, or may be implemented with a Peltier element. When the cooling device 453 is implemented with a small pump or a radiator, the amount of refrigerant to flow into the refrigerant circulating part 432 is small, so that a small pump of $5\times5$ cm$^2$ or less may be used.

The method of generating a current by the heating module 452, the method of making the refrigerant flow by the cooling device 453, the method of cooling the refrigerant that has absorbed heat, and the like are executable by various control methods, so that in the exemplary embodiment of the present disclosure, the method is not limited to any one method.

Next, an example in which the wearable robot 300 imitates an elbow bending motion when a patient bends an elbow in the state where the patient wears the wearable robot 300 will be described with reference to FIGS. 11A and 11B.

Figure 11A:
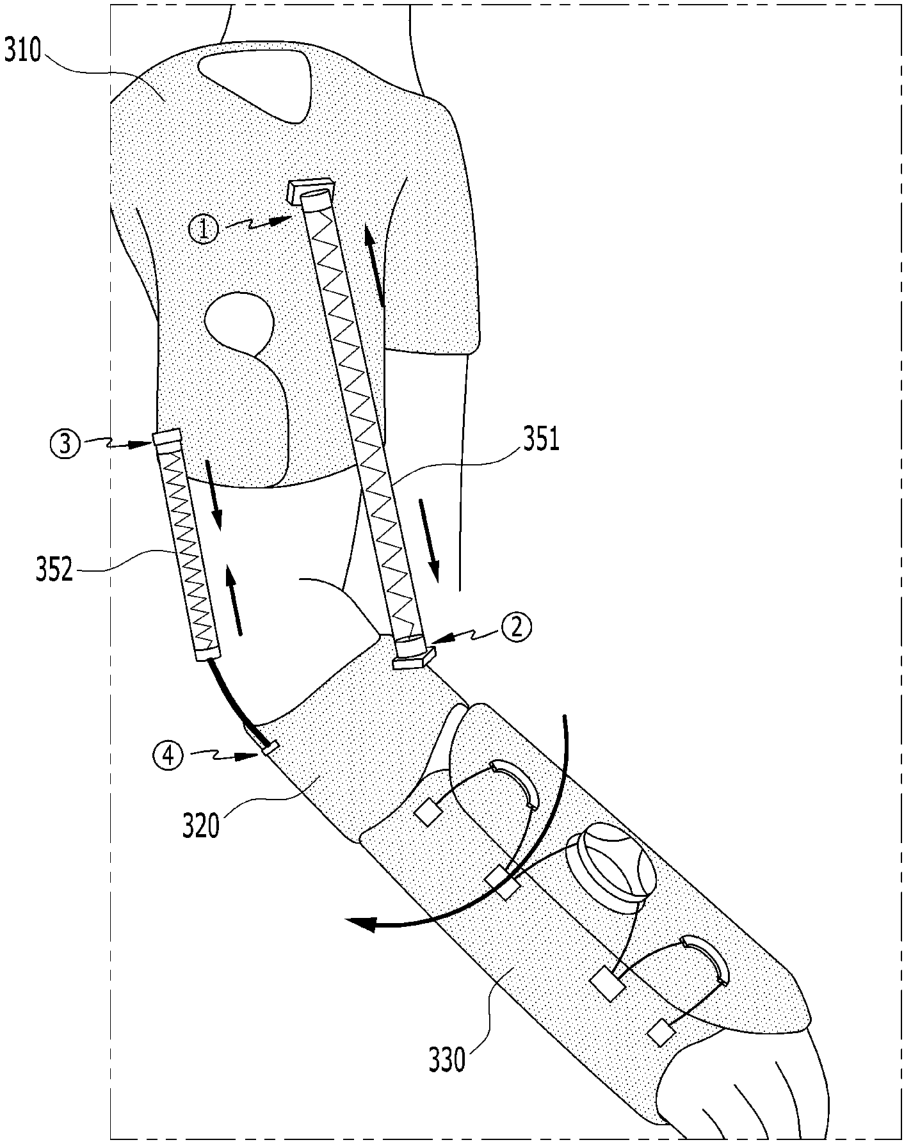
FIGS. 11A and 11B are diagrams illustrating an example of an imitation of an elbow bending motion of the wearable robot according to the second exemplary embodiment of the present disclosure.
Figure 11B:
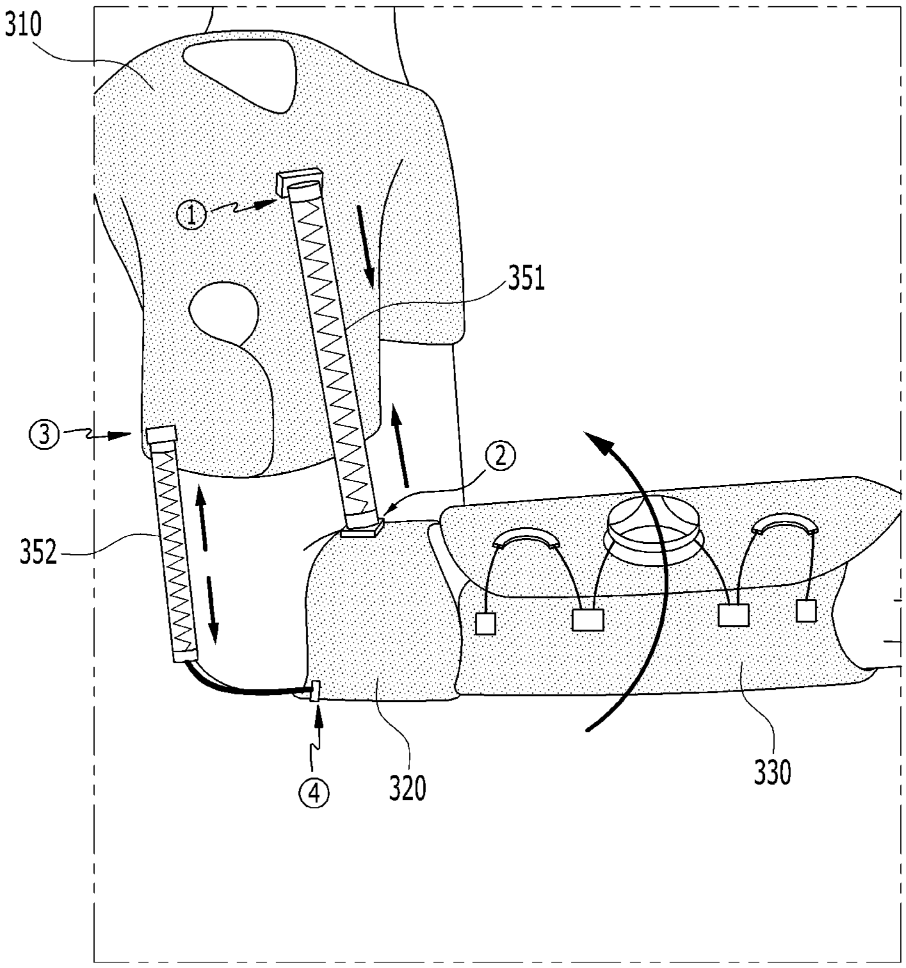

FIGS. 11A and 11B are diagrams illustrating examples of an imitation of elbow bending motion of the wearable robot according to the second exemplary embodiment of the present disclosure.

Both ends ① and ② of the elbow bending actuator 351 for bending the elbow are fixed to the front side of the shoulder wearing part 310 and an upper side of the forearm wearing part 320 worn on the patient. Further, both ends ③ and ④ of the elbow unfolding actuator 352 for unfolding the elbow are fixed to the front side of the shoulder wearing part 310 and the upper side of the forearm wearing part 320 worn on the patient.

Under the control of the control unit, the elbow bending actuator 351 and the elbow unfolding actuator 352 are contracted/relaxed. Through this, the bending motion and the unfolding motion of the elbow joint may be implemented.

Further, according to an angle range of the target elbow motion, the positions of the portions to which both ends ① and ② of the elbow bending actuator 351 and both ends ③ and ④ of the elbow unfolding actuator 352 are connected in the shoulder wearing part 310 and the forearm wearing part 320 may also be adjusted.

In the case of the shoulder wearing part 310 and the forearm wearing part 320, for strong fixing, an elastic body, a sheet to which an anti-sleep structure is applied, and the like may be attached to the region where the body is in contact with each of the wearing parts 310 and 320. Further, a string or a Velcro structure that may be adjusted in a length for fixing after each of the wearing parts 310 and 320 is worn may be additionally applied.

In order to withstand the force applied to each of the wearing parts 310 and 320, the regions connected with the elbow bending actuator 351 and the elbow unfolding actuator 352 may be manufactured of a light and hard plastic material, such as polycarbonate or acryl.

As illustrated in FIG. 11A, in the state where the elbow unfolding actuator 352 is contracted and the elbow bending actuator 351 is relaxed, the patient may maintain the state where the elbow is unfolded by 120° or more.

Further, as illustrated in FIG. 11B, in the state where the elbow bending actuator 351 is contracted, the patient may maintain the state where the elbow is bent by 90° or less. When the elbow bending motion is imitated, the elbow unfolding actuator 352 may be easily stretched due to the high flexibility of the actuator and low elastic force against force.

Next, an example in which the wearable robot 300 imitates a forearm rotation motion when a patient attempts a forearm rotation motion in the state of wearing the wearable robot 300 will be described with reference to FIGS. 12A to 12C.

Figure 12A:
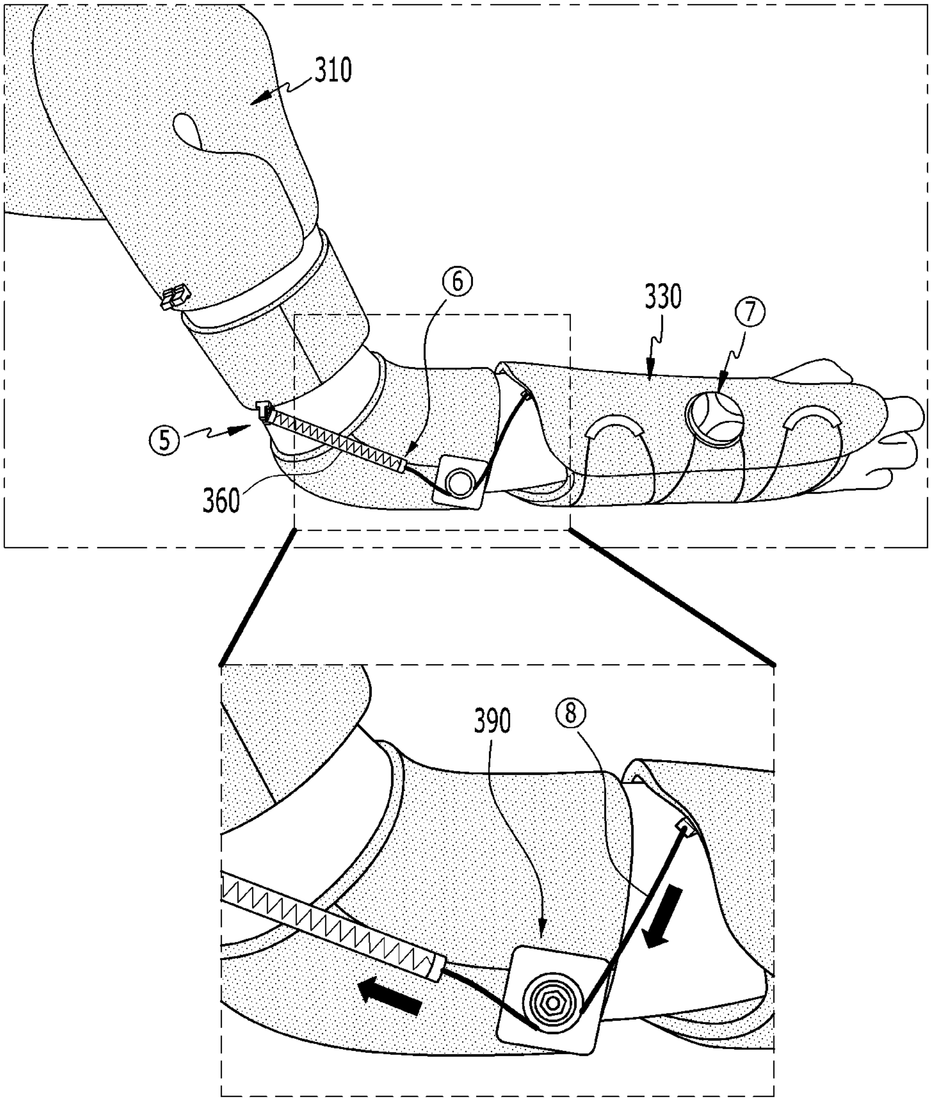
FIGS. 12A to 12C are diagrams illustrating an example of an imitation of a forearm rotation motion of the wearable robot according to the second exemplary embodiment of the present disclosure.
Figure 12B:
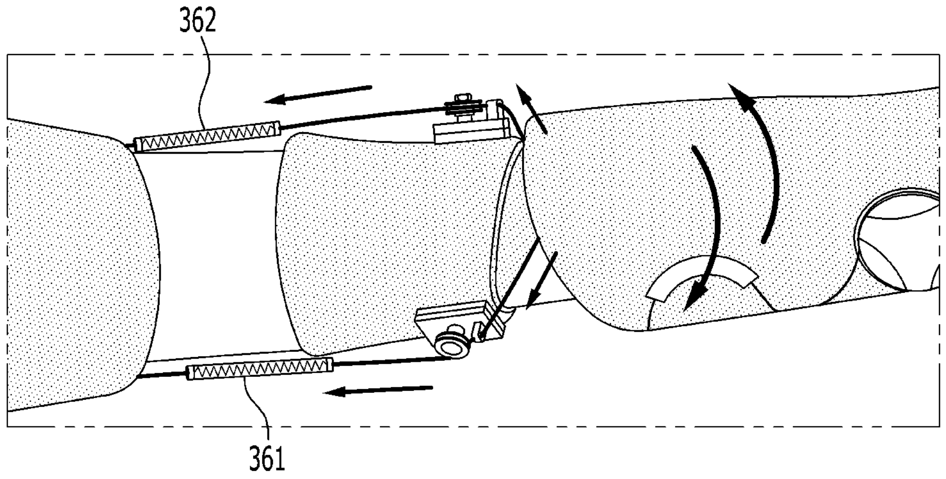
Figure 12C:
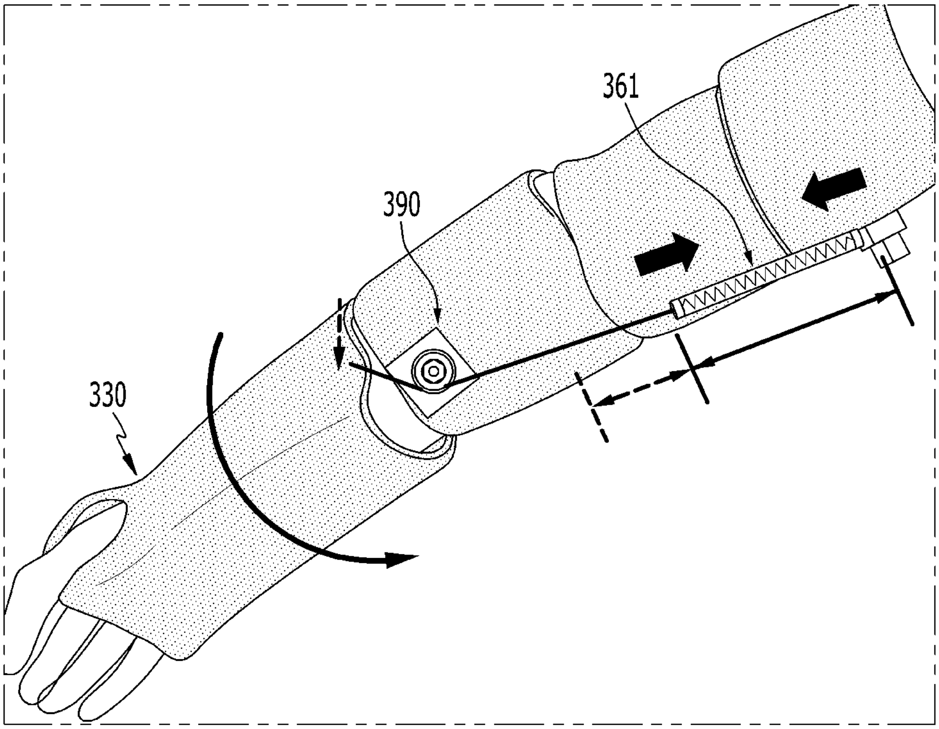

FIGS. 12A to 12C are diagrams illustrating an example of an imitation of a forearm rotation motion of the wearable robot according to the second exemplary embodiment of the present disclosure.

As illustrated in FIG. 12A, one end of the forearm rotation actuator 360 is connected to the lower rear portion ⑤ of the shoulder wearing part 110. A wire is connected to the other end ⑥ of the forearm rotation actuator 360, and another end of the corresponding wire is connected to the wrist wearing part 330.

In this case, FIG. 12A illustrates only one forearm rotation actuator 360 in the external portion of the body of the wearer in the wrist wearing part 330, but as illustrated in FIG. 12B, another forearm rotation actuator 362 is connected in the body direction of the wearer.

Further, in order to be connected to the wrist wearing part 330, one side of the forearm rotation actuator 360 is connected to an end of a string structure ⑧ (or referred to as a "connection structure"), such as metal and nylon, in order to withstand a large load. One end of the connection structure ⑧ is connected with the forearm rotation actuator 360, and the other end is connected to the wrist wearing part 330.

Finally, the other side of the connection structure ⑧ is connected with the wrist wearing part 330. Finally, the forearm rotation actuator 360 has the form connected to the shoulder wearing part 310 and the wrist wearing part 330.

The shoulder wearing part 310 may be manufactured of a cloth material, such as nylon, cotton, and synthetic fabric, mainly used for cloth to increase wearability and reduce weight. Further, the region directly connected with the forearm rotation actuator 360 in the shoulder wearing part 310 and the forearm wearing part 320 may be manufactured of plastic of a solid material, such as polycarbonate and acryl, in order to disperse stress and increase durability.

The wrist wearing part 330 is worn in the form of softly surrounding the entire wrist, and may be manufactured of a cloth material, such as nylon and cotton or a material, such as artificial leather. Further, the BOA structure ⑦ may be implemented at one side of the wrist wearing part 330, so that the wrist wearing part 330 may be fixed to be suitable to a body size of the wearer. In the exemplary embodiment of the present disclosure, for convenience of the description, the present disclosure is described based on the example in which the BOA structure ⑦ is implemented only in the wrist wearing part 330, but the present disclosure is not essentially limited thereto.

The pulley part 390 is attached to the forearm wearing part 320 to change a direction of force of the contracted forearm rotation actuator 360 to a forearm rotation movement direction.

That is, the pulley part 390 rotates based on an axis in a vertical direction. When the connection structure ⑧ connected to the pulley part 390 is pulled in the direction of the forearm rotation actuator 360 or pulled toward the wrist wearing part 330 according to the contraction or the relaxation of the driving part of the forearm rotation actuator 360, the pulley part 390 rotates based on the axis according to the movement of the connection structure ⑧, so that the direction of the force is changed to the forearm rotation movement direction. The function of the pulley part 390 has been already known, so that the detailed description thereof will be omitted in the exemplary embodiment.

The pulley part 390 is implemented in a grooved bearing structure in order to fix the connection structure ⑧ that serves as a tendon of the forearm rotation actuator 360 to the pulley part 390. Through this, it is possible to rotate the connection structure ⑧ in a direction in which force is applied without friction to the pulley part 390.

The pulley part 390 may also amplify a rotation displacement by combining a plurality of pulley structures having different radiuses so that larger displacement than the contraction displacement of the forearm rotation actuator 360 occurs by the rotation of the pulley structure. Herein, the rotation movement by the contraction of the forearm rotation actuator 360 is as illustrated in FIGS. 12B and 12C.

First, as illustrated in FIG. 12B, in the state where the forearm rotation actuators 361 and 362 are relaxed, force is balanced between the first forearm rotation actuator 361 and the second forearm rotation actuator 362. Accordingly, the forearm of the wearer may be in a neutral location.

However, as illustrated in FIG. 12C, when the forearm rotation actuators 361 and 362 are contracted by the electric signal, a force is applied to the wrist wearing part 330 through the pulley part 390 to generate the forearm rotation movement.

Next, the thumb actuator 370 or the index finger actuator 380 for imitating the finger bending movement by the wearable robot 300 when the patient bends the finger in the state of wearing the wearable robot 300 according to the exemplary embodiment of the present disclosure will be described with reference to FIG. 13. In the exemplary embodiment of the present disclosure, for convenience of the description, the present is described based on the thumb actuator 370 as an example.

Figure 13:
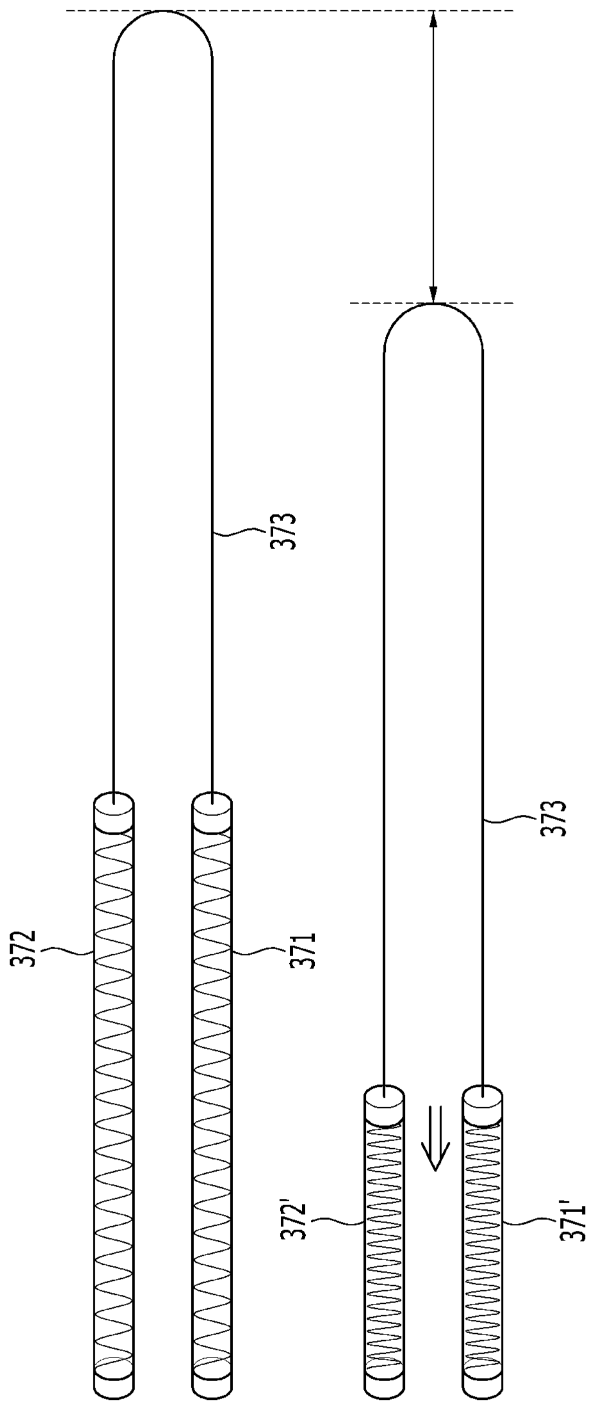
FIG. 13 is a diagram illustrating an example of a thumb actuator according to the second exemplary embodiment of the present disclosure.

FIG. 13 is a diagram illustrating an example of the thumb actuator according to the exemplary embodiment of the present disclosure.

As illustrated in FIG. 13, the thumb actuator 370 includes a pair of thumb actuators 371 and 372, and one side of each of the thumb actuators 371 and 372 is connected to a wire part 373. Herein, the wire part 373 is manufactured of a metal or nylon material and has high rigidity and is capable of withstanding strong tension, but is manufactured thin to have good bending properties.

As illustrated in the lower end of FIG. 13, when the thumb actuators 371' and 372' are contracted, the wire part 373 is pulled forward from a reference location by the contraction of the thumb actuators 371' and 372'. When the wire part 373 is pulled, a length of the wire located between the glove wearing part and the fixing part (not illustrated) fixing the wire part 373 to the glove wearing part 340 is decreased. Accordingly, the wearable robot 300 imitates the bending movement of the finger.

The example in which the wearable robot 300 including the thumb actuator 370 or the index finger actuator 380 imitates the finger folding movement and the finger bending movement will be described with reference to FIGS. 14 and 15.

Figure 14:
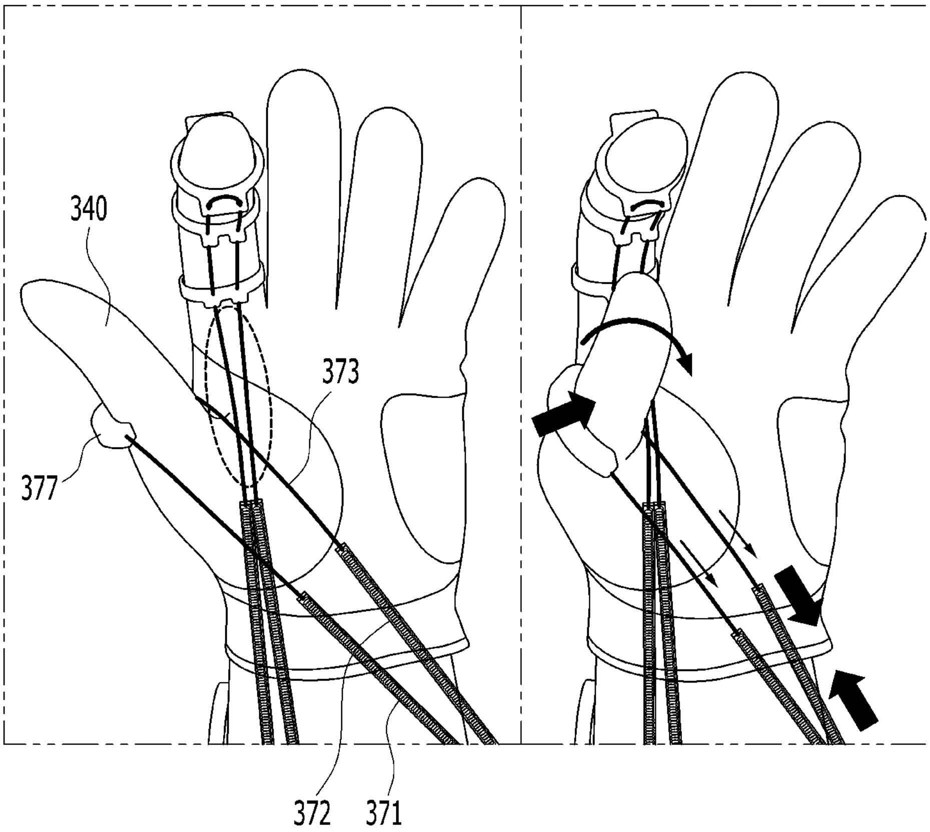
FIG. 14 is a diagram illustrating an example in which the wearable robot imitates a finger folding motion according to the second exemplary embodiment of the present disclosure.
Figure 15:
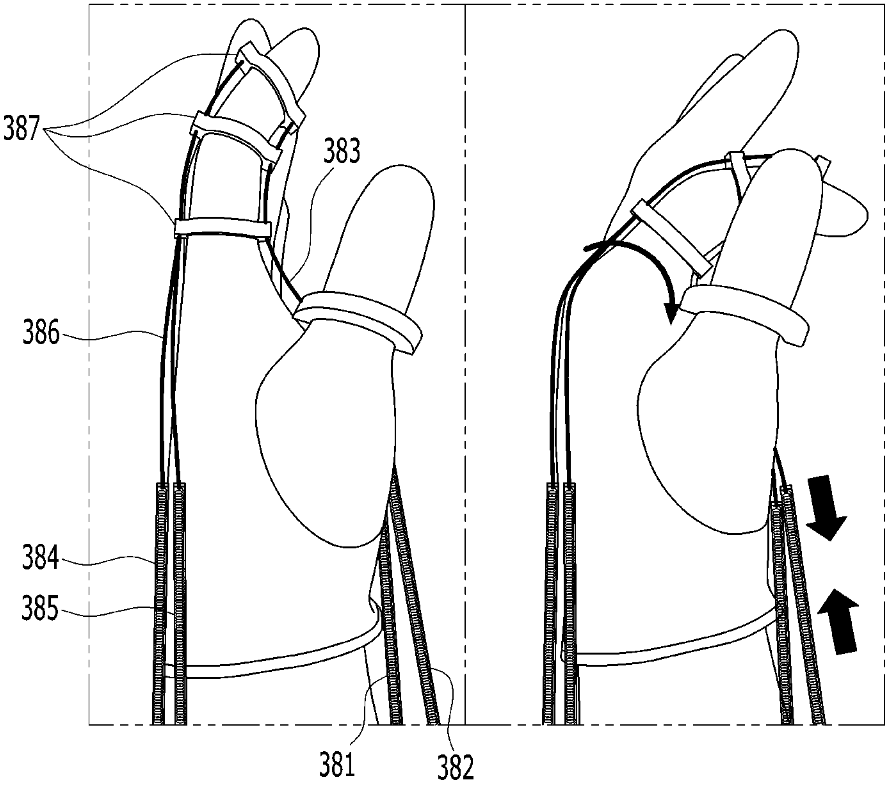
FIG. 15 is a diagram illustrating an example in which the wearable robot imitates a finger bending motion according to the second exemplary embodiment of the present disclosure.

FIG. 14 is a diagram illustrating an example in which the wearable robot imitates a finger folding motion according to the second exemplary embodiment of the present disclosure, and FIG. 15 is a diagram illustrating an example in which the wearable robot imitates a finger bending motion according to the second exemplary embodiment of the present disclosure.

As illustrated in FIG. 14, when the thumb actuators 371 and 372 provided in the palm portion are contracted, the wire part 373 is pulled in the direction of the palm. Then, the finger folding movement of the thumb is implemented by pulling a first wire fixing part 377 fixed to the glove wearing part 340.

Similarly, as illustrated in FIG. 15, the wire part 383 is pulled while the driving part of the index finger actuator 380 is contracted. Simultaneously, the wearable robot 300 may imitate the index finger bending movement while the wire pulls a second wire fixing part 384 fixed to the glove wearing part 340.

In this case, the finger bending angle according to the contraction of the index finger actuator 380 may be adjusted as desired by adjusting the location and the height of the second wire fixing part 384. In the exemplary embodiment of the present disclosure, the present disclosure is described based on the example in which the wearable robot 300 imitates the index finger bending movement, but the bending motion of the middle finger, ring finger, or little finger may also be imitated in the same method.

In the meantime, when the thumb actuator 370 is attached to the back of the hand, the wearable robot 300 imitates the thumb unfolding movement according to the relaxation of the driving part. Similarly, when the index finger actuators 384 and 385 are attached to the back of the hand, the wearable robot 300 may imitate the index finger unfolding movement in the bent state by the relaxation of the driving part.

As described above, the present disclosure may imitate the elbow bending motion, the forearm rotation motion, and the finger folding and bending motions by using the flexible actuator that is operated similarly to the muscle of the human and is deformed by heat by using the wearable robot 300. According to the exemplary embodiment of the present disclosure, artificial muscle which is formed of muscle fibers, motor nerves, and the like and is capable of imitating human muscle is applied to a wearable robot by using an actuator.

Further, it is possible to develop a wearable robot that is light and is easily wearable, and exerts large force by using the heat-shrinkable driving device having excellent elasticity.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A wearable robot for assisting a wrist, to which heat-shrinkable artificial muscle is applied, the wearable robot comprising:

a plurality of flexible actuators including
- a plurality of first flexible actuators each having a first end configured to be installed on a back of a hand of a wearer and a second end configured to be installed on a wrist of the wearer, and
- a plurality of second flexible actuators each having a first end configured to be installed on a palm of the hand of the wearer and a second end configured to be installed on the wrist of the wearer;

a sensor which senses an intensity of force applied to the heat-shrinkable artificial muscle wearable robot; and a control unit configured to control any one of the plurality of flexible actuators to be contracted or relaxed according to a wrist movement of a wearer, and in response to the intensity of force sensed by the sensor being larger than a predetermined threshold intensity, restore at least one flexible actuator contracted or relaxed among the plurality of flexible actuators to an initial state, wherein each of the plurality of flexible actuators includes:

a driving part which is contractively deformed by a current or transfer heat applied from the control unit or is relaxed when the heat is lost, and a refrigerant circulating part which is implemented to surround the driving part and circulates a refrigerant so that the contractively deformed driving part is cooled under control of the control unit.

2. The wearable robot of claim 1, wherein:

the control unit includes:

a heating module which applies any one of the current and the transfer heat to the driving part; and a cooling device which discharges the refrigerant to a refrigerant movement tube connected in a first direction so that the refrigerant is circulated in the refrigerant circulating part.

3. The wearable robot of claim 1, further comprising:

a first connector connected with a first end point of the driving part; and a second connector connected with a second end point that is opposite to the first end point of the driving part.

4. The wearable robot of claim 3, further comprising:

a refrigerant inlet which makes the refrigerant discharged from the cooling device flow into the refrigerant circulating part and is provided at one side of the first connector; and a refrigerant outlet which is provided at one side of the second connector and discharges the refrigerant that has absorbed heat of the driving part in the refrigerant circulating part to the cooling device.

5. The wearable robot of claim 4, wherein:

the cooling device is formed of a Peltier element or is implemented with a pump and a radiator, and the driving part is implemented with a shape memory alloy coil spring.

6. The wearable robot of claim 3, wherein:

the control unit and each of the plurality of flexible actuators are connected to the refrigerant movement tube which transfers the refrigerant discharged from the cooling device in a first direction to the refrigerant inlet and transfers the refrigerant that is discharged from the refrigerant outlet and has absorbed the heat to the cooling device, and an electric wire connected to the first end point and the second end point of the driving part through the first connector and the second connector and transfers any one of the current and the transfer heat applied from the heating module to the driving part.

7. The wearable robot of claim 1, further comprising:

a robot motion measuring part which measures a movement of the heat-shrinkable artificial muscle wearable robot and is implemented with a flexible strain sensor or an Inertial Measurement Unit (IMU) sensor; and a wearer's intention measuring unit which senses an intention of a wearer wearing the heat-shrinkable artificial muscle wearable robot and is implemented with a pressure sensor or an ElectroMyoGraphy (EMG) sensor.

8. The wearable robot of claim 1, wherein the plurality of first flexible actuators includes a first flexible actuator located on a thumb side of the wearer and a first flexible actuator located on a little finger side of the wearer, and wherein the plurality of second flexible actuators includes a second flexible actuator located on the thumb side of the wearer and a second flexible actuator located on the little finger side of the wearer.

9. The wearable robot of claim 1, wherein the control unit controls the plurality of flexible actuators including the plurality of first flexible actuators and the plurality of second flexible actuators to implement a two-degree-of freedom movement of flexion/extension and ulnar/radial deviation for the wrist.

10. The wearable robot of claim 9, wherein the plurality of second flexible actuators are driven to implement the flexion of the wrist, and wherein the plurality of first flexible actuators are driven to implement the extension of the wrist.

11. The wearable robot of claim 9, wherein a first flexible actuator located on a little finger side of the wearer among the plurality of first flexible actuators and a second flexible actuator located on the little finger side of the wearer among the plurality of second flexible actuators are driven to implement the ulnar deviation of the wrist, and wherein a first flexible actuator located on a thumb side of the wearer among the plurality of first flexible actuators and a second flexible actuator located on the thumb side of the wearer among the plurality of second flexible actuators are driven to implement the radial deviation of the wrist.

* * * * *